United States Patent
Yamazaki et al.

(10) Patent No.: US 9,361,853 B2
(45) Date of Patent: Jun. 7, 2016

(54) ELECTRONIC BOOK

(71) Applicant: Semiconductor Energy Laboratory Co., Ltd., Kanagawa-ken (JP)

(72) Inventors: Shunpei Yamazaki, Tokyo (JP); Jun Koyama, Kanagawa (JP); Yasuyuki Arai, Kanagawa (JP); Ikuko Kawamata, Kanagawa (JP); Atsushi Miyaguchi, Kanagawa (JP); Yoshitaka Moriya, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 14/727,113

(22) Filed: Jun. 1, 2015

(65) Prior Publication Data

US 2015/0355680 A1 Dec. 10, 2015

Related U.S. Application Data

(63) Continuation of application No. 13/864,752, filed on Apr. 17, 2013, now Pat. No. 9,047,799, which is a continuation of application No. 12/769,266, filed on Apr. 28, 2010, now Pat. No. 8,427,420.

(30) Foreign Application Priority Data

May 2, 2009 (JP) ................................. 2009-112375

(51) Int. Cl.
*G09G 5/00* (2006.01)
*G06F 1/16* (2006.01)
(Continued)

(52) U.S. Cl.
CPC .............. *G09G 5/003* (2013.01); *G02F 1/1368* (2013.01); *G02F 1/13452* (2013.01);
(Continued)

(58) Field of Classification Search
CPC .... G06F 3/002; G06F 1/1652; Y10S 345/901
See application file for complete search history.

(56) References Cited

U.S. PATENT DOCUMENTS 6,072,476 A 6/2000 Harada et al.
6,486,890 B1 11/2002 Harada et al.
(Continued)

FOREIGN PATENT DOCUMENTS

CN 001140848 A 1/1997
CN 001391287 A 1/2003
(Continued)

OTHER PUBLICATIONS

International Search Report re Application No. PCT/JP2010/056722, dated Jun. 15, 2010.
(Continued)

*Primary Examiner* — Kevin M Nguyen
(74) *Attorney, Agent, or Firm* — Husch Blackwell LLP

(57) ABSTRACT

An e-book reader in which destruction of a driver circuit at the time when a flexible panel is handled is inhibited. In addition, an e-book reader having a simplified structure. A plurality of flexible display panels each including a display portion in which display control is performed by a scan line driver circuit and a signal line driver circuit, and a binding portion fastening the plurality of display panels together are included. The signal line driver circuit is provided inside the binding portion, and the scan line driver circuit is provided at the edge of the display panel in a direction perpendicular to the binding portion.

16 Claims, 22 Drawing Sheets

(51) Int. Cl.

| | | |
|---|---|---|
| *G02F 1/1368* | (2006.01) | |
| *G02F 1/1333* | (2006.01) | |
| *G02F 1/1345* | (2006.01) | |
| *G06F 3/147* | (2006.01) | |
| *G09G 3/20* | (2006.01) | |
| *G06F 3/14* | (2006.01) | |
| *G09G 3/34* | (2006.01) | |

(52) U.S. Cl.
CPC ....... *G02F 1/133305* (2013.01); *G06F 1/1616* (2013.01); *G06F 1/1635* (2013.01); *G06F 1/1647* (2013.01); *G06F 1/1652* (2013.01); *G06F 3/147* (2013.01); *G09G 3/20* (2013.01); *G06F 3/1423* (2013.01); *G09G 3/344* (2013.01); *G09G 2300/08* (2013.01); *G09G 2310/0218* (2013.01); *G09G 2310/0267* (2013.01); *G09G 2310/0275* (2013.01); *G09G 2310/0281* (2013.01); *G09G 2330/021* (2013.01); *G09G 2360/144* (2013.01); *G09G 2380/02* (2013.01); *G09G 2380/14* (2013.01)

(56) References Cited

U.S. PATENT DOCUMENTS

| | | | |
|---|---|---|---|
| 6,680,724 | B2 | 1/2004 | Lichtfuss |
| 6,774,884 | B2 | 8/2004 | Shimoda et al. |
| 6,876,422 | B2 | 4/2005 | Ishiwa et al. |
| 6,885,146 | B2 | 4/2005 | Yamazaki et al. |
| 6,974,971 | B2 | 12/2005 | Young |
| 7,072,018 | B2 | 7/2006 | Yamamura et al. |
| 7,084,045 | B2 | 8/2006 | Takayama et al. |
| 7,154,452 | B2 | 12/2006 | Nakamura et al. |
| 7,199,520 | B2 | 4/2007 | Fujii et al. |
| 7,224,118 | B2 | 5/2007 | Yamazaki et al. |
| 7,341,924 | B2 | 3/2008 | Takayama et al. |
| 7,355,338 | B2 | 4/2008 | Osame et al. |
| 7,411,344 | B2 | 8/2008 | Yamazaki et al. |
| 7,495,382 | B2 | 2/2009 | Yamazaki et al. |
| 7,566,633 | B2 | 7/2009 | Koyama et al. |
| 7,674,650 | B2 | 3/2010 | Akimoto et al. |
| 7,732,819 | B2 | 6/2010 | Akimoto et al. |
| 7,880,380 | B2 | 2/2011 | Yamazaki et al. |
| 7,898,501 | B2 | 3/2011 | Jang et al. |
| 7,910,490 | B2 | 3/2011 | Akimoto et al. |
| 7,932,521 | B2 | 4/2011 | Akimoto et al. |
| 8,274,077 | B2 | 9/2012 | Akimoto et al. |
| 8,319,725 | B2 | 11/2012 | Okamoto et al. |
| 8,450,914 | B2 | 5/2013 | Gyoda |
| 8,466,463 | B2 | 6/2013 | Akimoto et al. |
| 8,629,069 | B2 | 1/2014 | Akimoto et al. |
| 8,669,550 | B2 | 3/2014 | Akimoto et al. |
| 8,790,959 | B2 | 7/2014 | Akimoto et al. |
| 8,796,069 | B2 | 8/2014 | Akimoto et al. |
| 8,917,016 | B2 | 12/2014 | Yamazaki et al. |
| 9,099,562 | B2 | 8/2015 | Akimoto et al. |
| 2002/0036616 | A1* | 3/2002 | Inoue ............... G02F 1/167 345/107 |
| 2003/0162162 | A1 | 8/2003 | Marggraff |
| 2003/0227441 | A1 | 12/2003 | Hioki et al. |
| 2004/0041800 | A1 | 3/2004 | Daniels |
| 2005/0130391 | A1 | 6/2005 | Takayama et al. |
| 2006/0139308 | A1* | 6/2006 | Jacobson ........... G02F 1/167 345/107 |
| 2007/0072439 | A1 | 3/2007 | Akimoto et al. |
| 2007/0077691 | A1 | 4/2007 | Watanabe |
| 2007/0085845 | A1 | 4/2007 | Kikuchi et al. |
| 2007/0108446 | A1 | 5/2007 | Akimoto |
| 2007/0195009 | A1 | 8/2007 | Yamamoto et al. |
| 2007/0253600 | A1 | 11/2007 | Furukawa et al. |
| 2007/0281375 | A1 | 12/2007 | Ibe et al. |
| 2008/0042940 | A1 | 2/2008 | Hasegawa |
| 2008/0049003 | A1 | 2/2008 | Hasegawa |
| 2008/0055831 | A1 | 3/2008 | Satoh |
| 2008/0158143 | A1* | 7/2008 | Kim ............... G02F 1/167 345/107 |
| 2008/0284934 | A1 | 11/2008 | Umezaki et al. |
| 2008/0308805 | A1 | 12/2008 | Akimoto et al. |
| 2009/0185127 | A1 | 7/2009 | Tanaka et al. |
| 2009/0239335 | A1 | 9/2009 | Akimoto et al. |
| 2009/0298037 | A1* | 12/2009 | Heffernan ......... G06Q 99/00 434/317 |
| 2010/0117999 | A1 | 5/2010 | Matsunaga et al. |
| 2011/0104851 | A1 | 5/2011 | Akimoto et al. |
| 2011/0121290 | A1 | 5/2011 | Akimoto et al. |
| 2015/0340513 | A1 | 11/2015 | Akimoto et al. |

FOREIGN PATENT DOCUMENTS

| | | |
|---|---|---|
| CN | 001732496 A | 2/2006 |
| CN | 001790108 A | 6/2006 |
| EP | 1 276 090 A1 | 1/2003 |
| EP | 1 577 862 A1 | 9/2005 |
| EP | 1 770 788 A2 | 4/2007 |
| EP | 1 830 336 A1 | 9/2007 |
| EP | 1 995 787 A2 | 11/2008 |
| EP | 1 998 373 A2 | 12/2008 |
| EP | 1 998 374 A2 | 12/2008 |
| EP | 1 998 375 A2 | 12/2008 |
| EP | 2 053 583 A1 | 4/2009 |
| JP | 63-006632 A | 1/1988 |
| JP | 04-355786 A | 12/1992 |
| JP | 09-080406 A | 3/1997 |
| JP | 11-272205 A | 10/1999 |
| JP | 2001-100667 A | 4/2001 |
| JP | 2001-311931 A | 11/2001 |
| JP | 2002-015858 A | 1/2002 |
| JP | 2002-169190 A | 6/2002 |
| JP | 2002-196298 A | 7/2002 |
| JP | 2002-366051 A | 12/2002 |
| JP | 2003-043955 A | 2/2003 |
| JP | 2003-058081 A | 2/2003 |
| JP | 2003-058544 A | 2/2003 |
| JP | 2003-197056 A | 7/2003 |
| JP | 2003-337322 A | 11/2003 |
| JP | 2003-337353 A | 11/2003 |
| JP | 2004-045976 A | 2/2004 |
| JP | 2004-279631 A | 10/2004 |
| JP | 2005-031651 A | 2/2005 |
| JP | 2005-038608 A | 2/2005 |
| JP | 2005-084228 A | 3/2005 |
| JP | 2005-114759 A | 4/2005 |
| JP | 2005-197673 A | 7/2005 |
| JP | 2005-338179 A | 12/2005 |
| JP | 2006-058764 A | 3/2006 |
| JP | 2006-091226 A | 4/2006 |
| JP | 2007-108441 A | 4/2007 |
| JP | 3131658 B U | 5/2007 |
| JP | 2007-250329 A | 9/2007 |
| JP | 2008-010418 A | 1/2008 |
| JP | 2008-046565 A | 2/2008 |
| JP | 2008-052040 A | 3/2008 |
| JP | 2008-233779 A | 10/2008 |
| JP | 2008-276212 A | 11/2008 |
| JP | 2008-299269 A | 12/2008 |
| JP | 2009-003436 A | 1/2009 |
| JP | 2009-021554 A | 1/2009 |
| JP | 2009-021612 A | 1/2009 |
| JP | 2009-063836 A | 3/2009 |
| JP | 2010-072271 A | 4/2010 |
| JP | 2011-145320 A | 7/2011 |
| TW | 546617 | 8/2003 |
| WO | WO 02/082555 A2 | 10/2002 |
| WO | WO 2006/090434 A2 | 8/2006 |
| WO | WO 2007/000719 A1 | 1/2007 |
| WO | WO 2008/013013 A1 | 1/2008 |
| WO | WO 2008/126884 A1 | 10/2008 |

OTHER PUBLICATIONS

Written Opinion re Application No. PCT/JP2010/056722, dated Jun. 15, 2010.

(56) References Cited

OTHER PUBLICATIONS

Chinese Office Action re Application No. CN 201080007997.3, dated Jun. 5, 2013.
Taiwanese Office Action re Application No. TW 099112735, dated Sep. 24, 2015.
Chinese Office Action re Application No. CN 201410124306.8, dated Sep. 16, 2015.
Korean Office Action re Application No. KR 2011-7026158, dated Mar. 22, 2016.

* cited by examiner

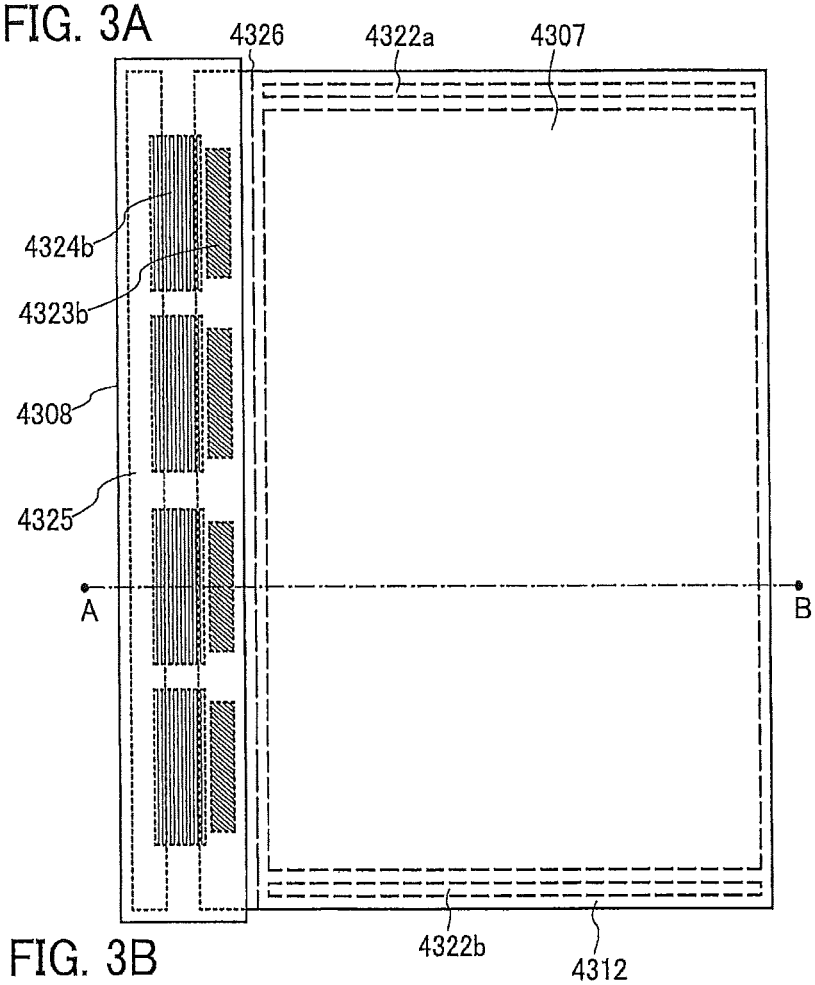
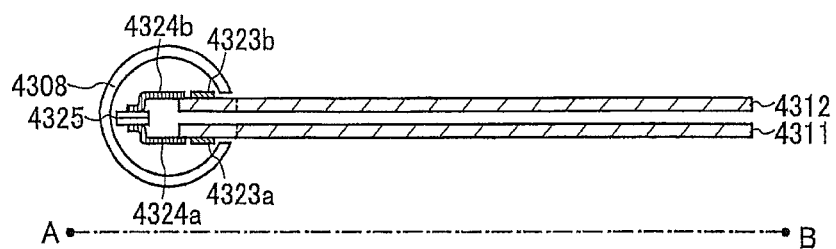
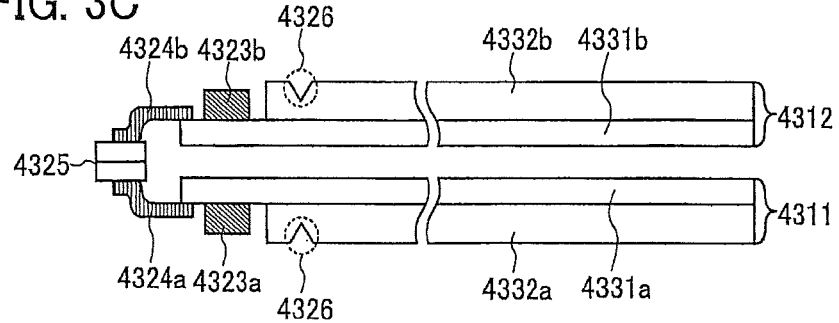

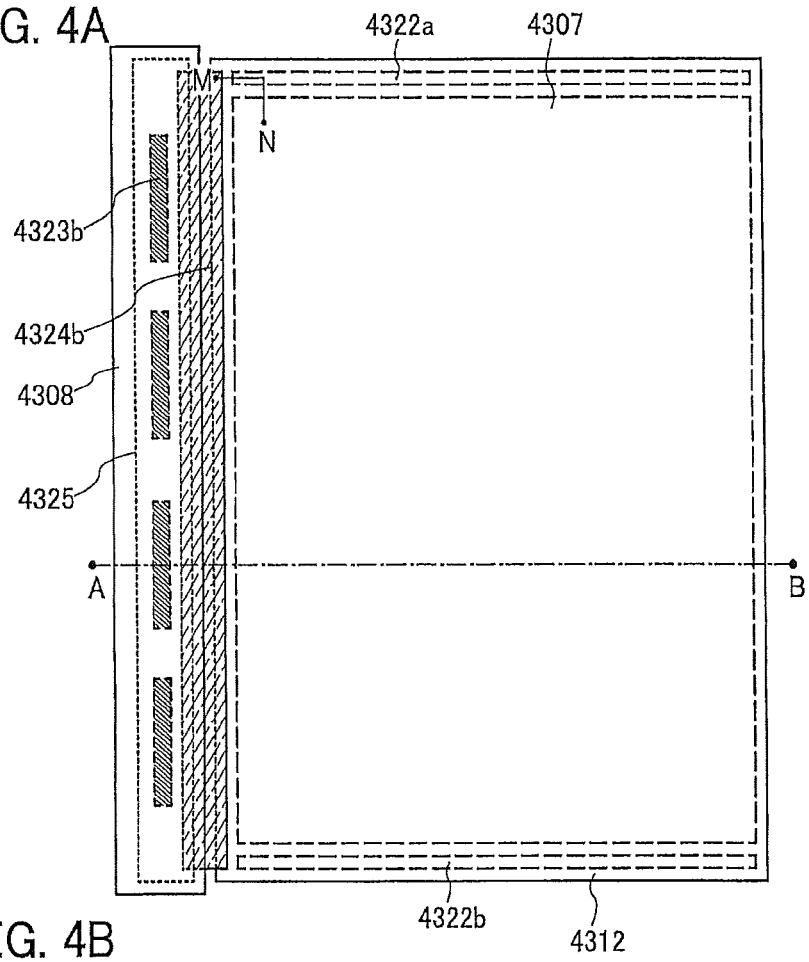
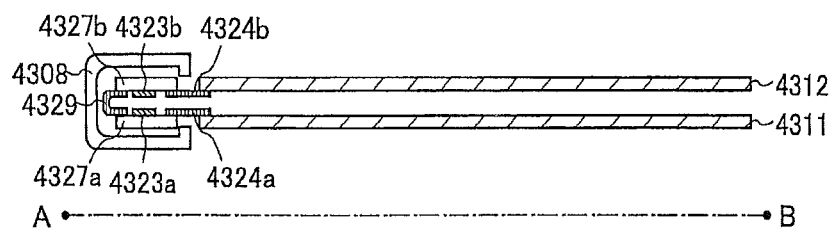
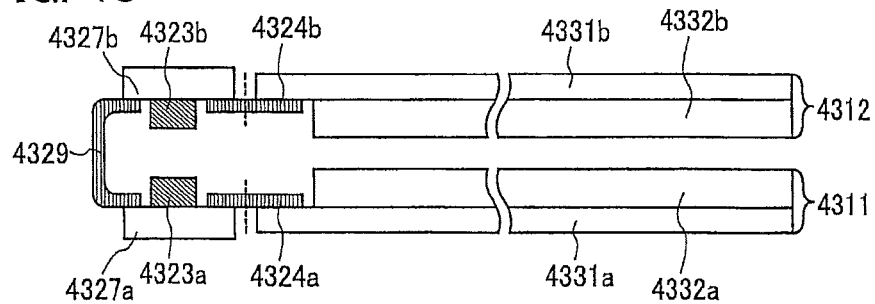

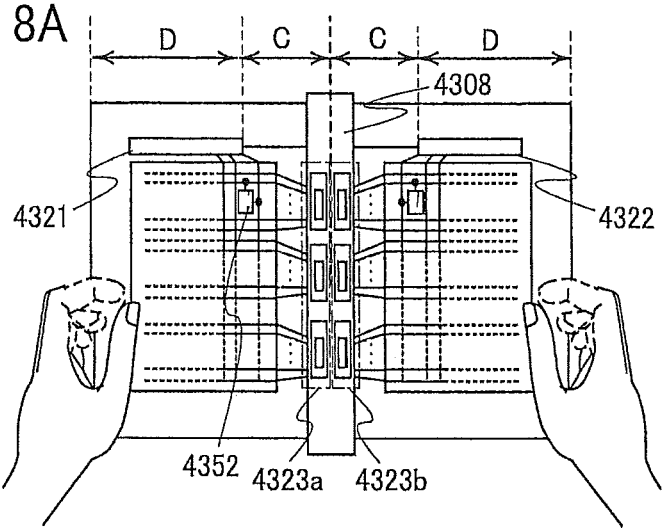
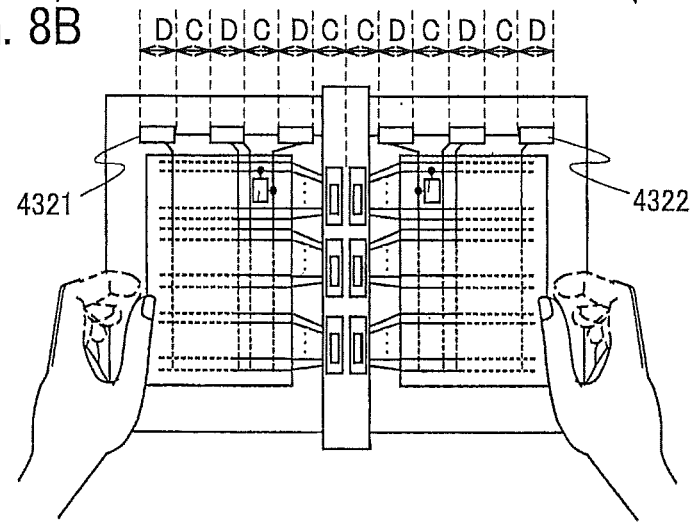
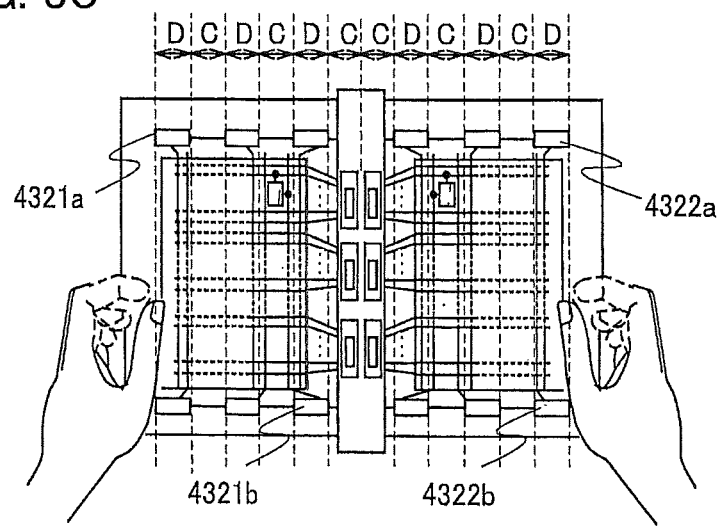

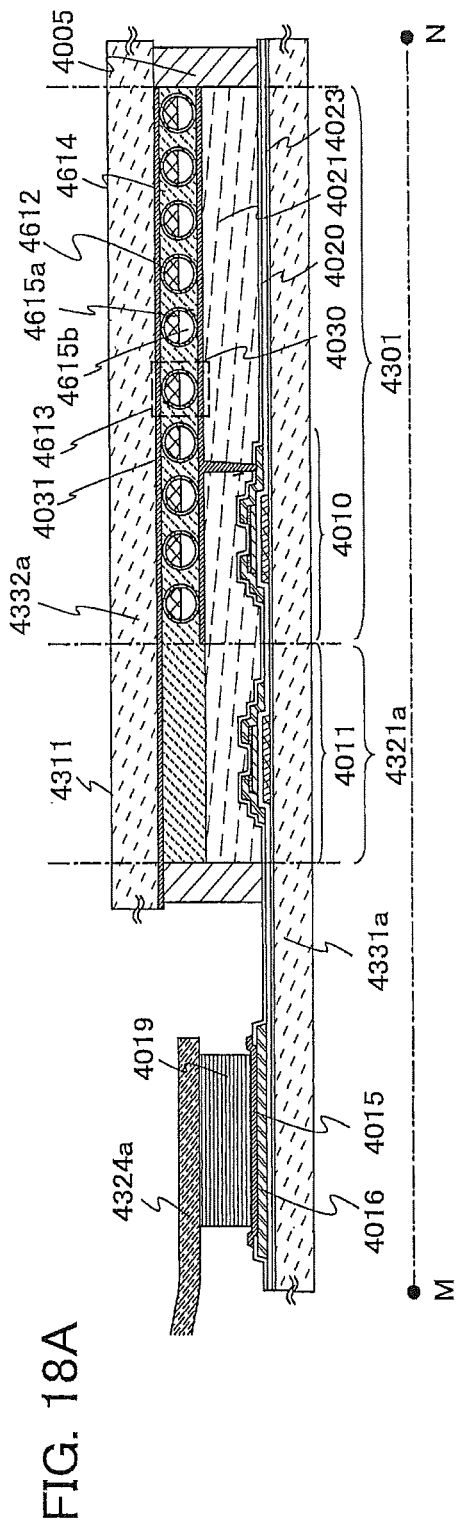
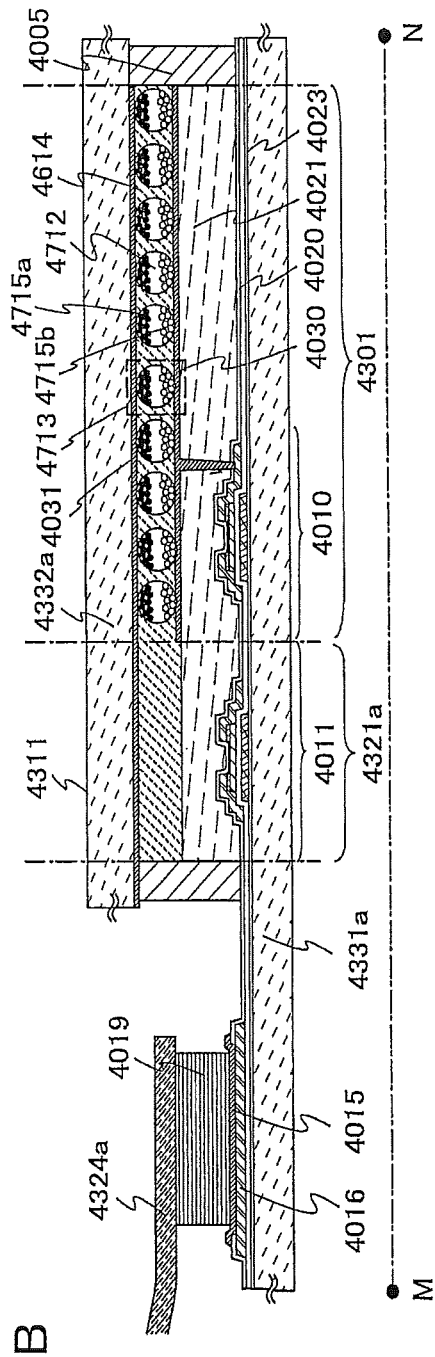
FIG. 18A
FIG. 18B

ELECTRONIC BOOK

This application is a continuation of copending U.S. application Ser. No. 13/864,752, filed on Apr. 17, 2013 which is a continuation of U.S. application Ser. No. 12/769,266, filed on Apr. 28, 2010 (now U.S. Pat. No. 8,427,420 issued Apr. 23, 2013), which are all incorporated herein by reference.

TECHNICAL FIELD

The technical field relates to an e-book reader.

BACKGROUND ART

In recent years, with the development of digitization techniques, a mode has been employed in which textual information and image information of newspapers, magazines, and the like are provided in the form of electronic data. This type of electronic data generally has a feature in which the content is viewed when displayed with a display device included in a personal computer or the like.

As the above display device which displays the electronic data, there is a portable display device as well as a stationary one. As a typical example of the portable display device, an e-book reader is given. The e-book reader is normally provided with a display portion on its front surface and a page-switching key on the periphery of its main body, which is operated to display data on the next page or the previous page on the display portion.

However, the e-book reader having the structure described above is handled very differently from paper media such as newspapers and magazines. An e-book reader is very different from a paper book especially in that pages are switched with key operation. Such a difference in the way they are handled causes the e-book reader a problem such as a lower efficiency of text reading, sentence comprehension, or image recognition than the paper media.

An e-book reader using a dual display device has been proposed in order to eliminate the above difference with paper media (e.g., see Patent Document 1 and Patent Document 2).

REFERENCE

[Patent Document]
[Patent Document 1] Japanese Published Patent Application No. 2005-38608
[Patent Document 2] Japanese Published Patent Application No. 2003-58081

DISCLOSURE OF INVENTION

It is an object of an embodiment of the disclosed invention to provide an e-book reader in which destruction of a driver circuit at the time when a flexible panel is handled is inhibited. It is another object of an embodiment of the disclosed invention to provide an e-book reader whose structure is simplified.

An embodiment of the disclosed invention is an e-book reader including a plurality of flexible display panels each including a display portion in which display control is performed by a scan line driver circuit and a signal line driver circuit, and a binding portion fastening the plurality of display panels together, where the signal line driver circuit is provided in the binding portion, and the scan line driver circuit is provided at an edge of the display panel in a direction perpendicular to the binding portion.

According to the e-book reader of an embodiment of the disclosed invention, the scan line driver circuit and the signal line driver circuit include transistors, and the transistor included in the scan line driver circuit may have a different structure from the transistor included in the signal line driver circuit.

According to an e-book reader of an embodiment of the disclosed invention, a channel layer of the transistor included in the scan line driver circuit is formed of a non-single-crystal semiconductor, and a channel layer of the transistor included in the signal line driver circuit is formed of a single crystal semiconductor.

According to the e-book reader of an embodiment of the disclosed invention, the non-single-crystal semiconductor is amorphous silicon, microcrystalline silicon, polysilicon, or an oxide semiconductor.

According to the e-book reader of an embodiment of the disclosed invention, the display portion includes a transistor, and a channel layer of the transistor included in the display portion and a channel layer of the transistor included in the scan line driver circuit are formed using the same material.

According to the e-book reader of an embodiment of the disclosed invention, the binding portion includes any one of a battery, an antenna, a CPU, or a memory, in addition to the signal line driver circuit.

According to the e-book reader of an embodiment of the disclosed invention, the scan line driver circuit includes a plurality of circuit portions which are spaced from each other.

According to the e-book reader of an embodiment of the disclosed invention, a stress concentration region is provided between the plurality of circuit portions.

According to an e-book reader of an embodiment of the disclosed invention, the plurality of display panels includes a first display panel including a first display portion, a second display panel including a second display portion, and a third display panel which is provided between the first display panel and the second display panel and which includes a third display portion on a first plane and a fourth display portion on a second plane opposite the first plane, where the third display panel is bent more easily than the first display panel and the second display panel.

According to the e-book reader of an embodiment of the disclosed invention, the first display panel includes a first photo sensor controlling the presence or absence of display on the first display portion and the third display portion, the second display panel includes a second photo sensor controlling the presence or absence of display on the second display portion and the fourth display portion, and the third display panel includes a light-shielding portion in a region overlapping with the first photo sensor and the second photo sensor.

Further, a "semiconductor device" in this specification and the like generally indicates a device capable of functioning by utilizing semiconductor characteristics, and electro-optic devices, semiconductor circuits, and electronic appliances are all semiconductor devices.

Further, a "display device" in this specification and the like includes, in its category, a light-emitting device and a liquid crystal display device. The light-emitting device includes a light-emitting element, and the liquid crystal display device includes a liquid crystal element. The light-emitting element includes, in its category, an element whose luminance is controlled by a current or a voltage, and specifically includes an inorganic electroluminescent (EL) element, an organic EL element, and the like.

According to an embodiment of the disclosed invention, an e-book reader in which destruction of a driver circuit is inhibited and which is sturdy can be provided.

According to an embodiment of the disclosed invention, simplification of a structure and a reduction in cost of an e-book reader are possible.

BRIEF DESCRIPTION OF DRAWINGS

In the accompanying drawings:

FIGS. 3A to 3C are views illustrating one mode of an e-book reader;

FIGS. 4A to 4C are views illustrating one mode of an e-book reader;

FIGS. 8A to 8C are views each illustrating one mode of an e-book reader;

FIGS. 18A and 18B are views each illustrating one mode of a display panel;

BEST MODE FOR CARRYING OUT THE INVENTION

Figure 1A:
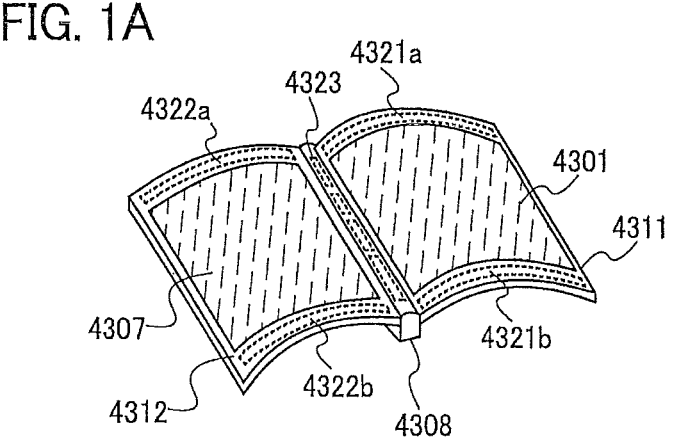
FIGS. 1A to 1C are views illustrating one mode of an e-book reader.

Hereinafter, Embodiments are described in detail using the drawings. Note that the present invention is not limited to the description of the embodiments, and it is apparent to those skilled in the art that the modes and details can be modified in various ways without departing from the spirit of the present invention disclosed in this specification and the like. Structures of different embodiments can be implemented in an appropriate combination. On the description of the invention with reference to the drawings, a reference numeral indicating the same part is used in common throughout different drawings, and description on the same part is omitted.

Note that the size, the thickness of a layer, or a region of each structure illustrated in drawings or the like in embodiments is exaggerated for simplicity in some cases. Embodiments of the present invention therefore are not limited to such scales.

Note that the terms "first", "second", "third" and the like in this specification are used in order to avoid confusion between components and do not set a limitation on number.

Embodiment 1

In Embodiment 1, an example of an e-book reader will be described with reference to drawings.

An e-book reader described in this embodiment includes a plurality of display panels each including a display portion in which display control is performed by a scan line driver circuit and a signal line driver circuit, and a binding portion fastening the plurality of display panels together. The signal line driver circuit is provided inside the binding portion, and the scan line driver circuit is provided for each of the plurality of display panels.

Figure 1B:
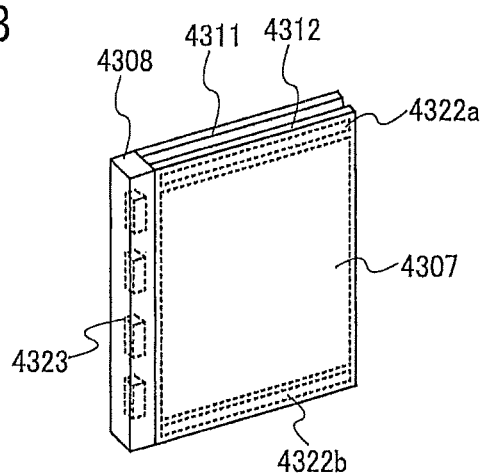
Figure 1C:
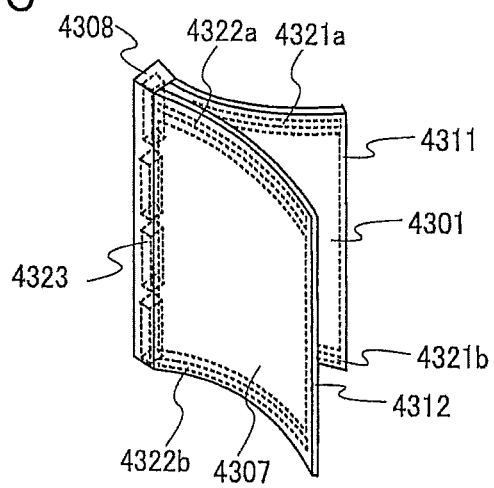

FIGS. 1A to 1C illustrate, as an example of the e-book reader including the plurality of display panels, an e-book reader in which a binding portion 4308 is provided at edges of two display panels (a first display panel 4311 and a second display panel 4312). Hereinafter, the e-book reader including the first display panel and the second display panel is specifically described with reference to FIGS. 1A to 1C. Note that FIG. 1A illustrates the opened e-book reader, FIG. 1B illustrates the closed e-book reader, and FIG. 1C illustrates the half-opened e-book reader.

The e-book reader illustrated in FIGS. 1A to 1C includes the first display panel 4311 including a first display portion 4301, the second display panel 4312 including a second display portion 4307, the binding portion 4308 provided at one edge of each of the first display panel 4311 and the second display panel 4312, scan line driver circuits 4321a and 4321b controlling display of the first display portion 4301, scan line driver circuits 4322a and 4322b controlling display of the second display portion 4307, and a signal line driver circuit 4323 controlling display of the first display portion 4301 and the second display portion 4307.

The scan line driver circuits 4321a and 4321b are provided for the first display panel 4311, the scan line driver circuits 4322a and 4322b are provided for the second display panel 4312, and the signal line driver circuit 4323 is provided inside the binding portion 4308.

The first display panel 4311 can be flexible. In that case, a pixel circuit included in the first display portion 4301 and the scan line driver circuits 4321a and 4321b may be provided over a flexible substrate such as a plastic substrate.

The second display panel 4312 can also be flexible, like the first display panel 4311. In that case also, a pixel circuit included in the second display portion 4307 and the scan line driver circuits 4322a and 4322b may be provided over a flexible substrate such as a plastic substrate.

The binding portion 4308 is preferably less flexible (more rigid) than at least the first display panel 4311 and the second display panel 4312. For example, a housing forming the binding portion 4308 can be formed using plastic, metal, or the like which is thicker than the first display panel 4311 and the second display panel 4312. In that case, the e-book reader can be bent (warped) at a portion other than the binding portion 4308.

There is no particular limitation on the location where the binding portion 4308 is provided. For example, the binding portion 4308 can be provided along one edge of each of the first display panel 4311 and the second display panel 4312. For example, as illustrated in FIGS. 1A to 1C, in the case where the first display panel 4311 and the second display panel 4312 have rectangular shapes, the binding portion 4308 can be provided along predetermined sides of the first display panel 4311 and the second display panel 4312 (so that the sides are fastened together). Note that the "rectangular shape" here includes a shape in which a corner of the rectangular is rounded.

The signal line driver circuit 4323 is provided inside the binding portion 4308. For example, the binding portion 4308 is formed using a columnar housing with a hollow or a cylindrical housing with a hollow, and the signal line driver circuit 4323 can be provided in the hollow. When the signal line driver circuit 4323 is provided inside the binding portion 4308, damage to the signal line driver circuit 4323 due to the bend of the display panel can be prevented.

Further, as illustrated in FIGS. 1A to 1C, the scan line driver circuits 4321a and 4321b are preferably provided at edges of the first display panel 4311 in a direction perpendicular or substantially perpendicular to the binding portion 4308. Similarly, the scan line driver circuits 4322a and 4322b are preferably provided at edges of the second display panel 4312 in a direction perpendicular or substantially perpendicular to the binding portion 4308. As a result, leading of a wiring can be reduced and the structure can be simplified in comparison with the case where the scan line driver circuit and the signal line driver circuit are provided in one portion (e.g., inside the binding portion 4308).

Further, when the scan line driver circuits 4321a and 4321b and a pixel circuit included in the first display portion 4301 are formed over a flexible substrate through the same process, the scan line driver circuits 4321a and 4321b can be bent and a reduction in cost can be achieved. Similarly, when the scan line driver circuits 4322a and 4322b and a pixel circuit included in the second display portion 4307 are formed over a flexible substrate through the same process, the scan line driver circuits 4322a and 4322b can be bent and a reduction in cost can be achieved.

The pixel circuit included in the first display portion 4301, the pixel circuit included in the second display portion 4307, and elements included in the scan line driver circuits 4321a, 4321b, 4322a, and 4322b can be formed using thin film transistors or the like. On the other hand, a circuit which is driven at a high speed such as the signal line driver circuit 4323 can be formed using an integrated circuit (IC) formed using an SOI substrate or a semiconductor substrate such as a silicon substrate, and the IC can be provided inside the binding portion 4308.

When an IC in which the circuit which is driven at a high speed such as the scan line driver circuit is provided inside the binding portion, and the scan line driver circuit and the pixel circuit included in the display portion are formed with elements such as thin film transistors over a flexible substrate as described above, the display panel can be bent easily, destruction of the IC due to the bending of the display panel can be inhibited, and a reduction in cost can be achieved in comparison with the case where the signal line driver circuit and the scan line driver circuit are provided with an IC. In addition, when the scan line driver circuit is provided on the display panel at the edge of the display panel in a direction perpendicular to the binding portion, leading of a wiring can be suppressed and the structure can be simplified.

Note that, although the case where the scan line driver circuits are provided at both edges of the first display panel 4311 is illustrated in FIGS. 1A to 1C, the scan line driver circuit (either one of the scan line driver circuit 4321a and the scan line driver circuit 4321b) may be provided at one of the edges. Similarly, although the case where the scan line driver circuits are provided at both edges of the second display panel 4312 is illustrated, the scan line driver circuit may be provided at one of the edges.

Embodiment 1 can be implemented by being combined with any of the structures described in the other embodiments as appropriate.

Embodiment 2

In Embodiment 2, a specific structure of the above e-book reader illustrated in FIGS. 1A to 1C will be described with reference to drawings. Note that since the structure described in this embodiment is in common with that described in Embodiment 1 in many points, description of the common points will be omitted and different points will be described in detail in the following description.

Figure 2A:
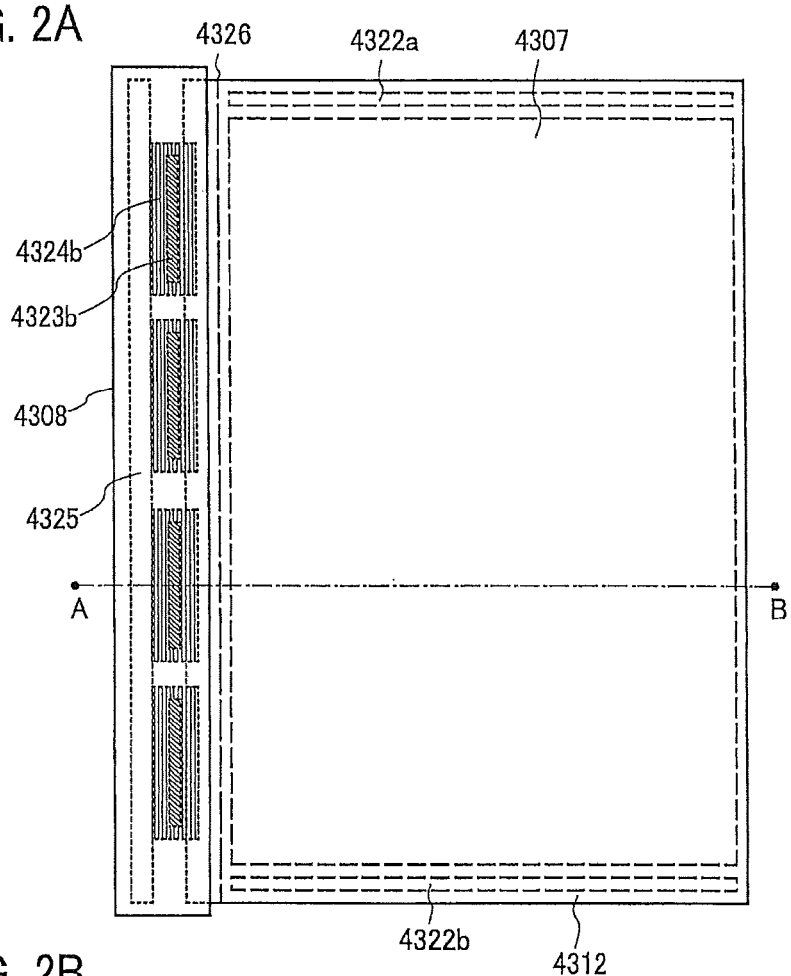
FIGS. 2A to 2C are views illustrating one mode of an e-book reader.

The specific structure of the e-book reader is described with reference to FIGS. 2A to 2C. FIG. 2A is a plan view of the closed e-book reader, FIG. 2B is a cross-sectional view taken along the line A-B of FIG. 2A, and FIG. 2C is a detailed schematic view of the cross section.

Figure 2B:
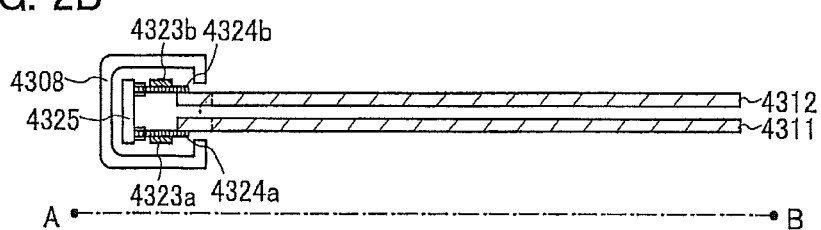
Figure 2C:
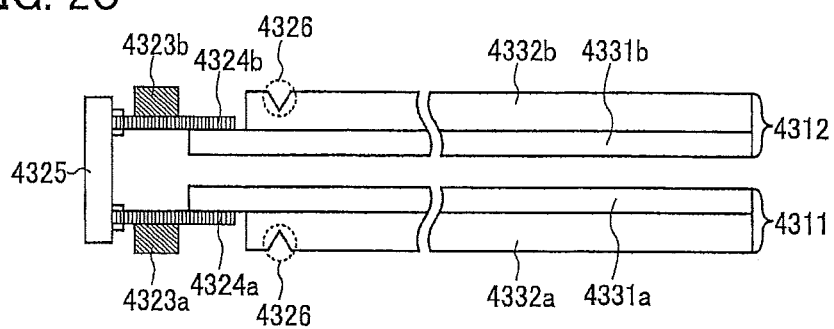

As for the e-book reader illustrated in FIGS. 2A to 2C, the binding portion 4308 is formed using a housing with a hollow, and the signal line driver circuit 4323 is provided inside the housing. Here, the signal line driver circuit 4323 is formed with an IC, and the IC is provided inside the binding portion 4308. The IC can be formed using an SOI substrate, a semiconductor substrate such as a silicon substrate, or the like. Needless to say, a circuit (e.g., a CPU or a memory) other than the signal line driver circuit can be provided for the IC.

Further, FIGS. 2A to 2C illustrate the case where the IC provided inside the binding portion 4308 is mounted on a flexible printed circuit (FPC) by a tape automated bonding (TAB) method.

More specifically, a signal line driver circuit 4323a controlling the first display portion 4301 is provided on an FPC 4324a, a signal line driver circuit 4323b controlling the second display portion 4307 is provided on an FPC 4324b, and the signal line driver circuit 4323a and the signal line driver circuit 4323b are electrically connected to each other through a printed board 4325. The FPC 4324a is electrically connected to the first display panel 4311 and the printed board 4325. The FPC 4324b is electrically connected to the second display panel 4312 and the printed board 4325.

In FIGS. 2A to 2C, the printed board 4325 can be provided to be in contact with the housing forming the binding portion 4308. In that case, the first display panel 4311 and the second display panel 4312 are fastened together by the binding portion 4308.

As illustrated in FIGS. 2A to 2C, in the case where the signal line driver circuit is provided on the FPC, a stress concentration region 4326 is preferably provided in one or both of the first display panel 4311 and the second display panel 4312. The provision of the stress concentration region 4326 in the display panel makes it possible to reduce the stress which is applied to the FPC when the e-book reader is opened (when the first display panel 4311 and/or the second display panel 4312 are/is bent) and to inhibit the destruction of the signal line driver circuit provided on the FPC.

Note that the "stress concentration region" refers to a region where stress is concentrated, which is formed by deformation of a material due to cutting or the like, bending due to attachment of a material or the like, or a change in strength against extension. Specifically, the stress concentration region 4326 can be formed by provision of a cut portion (a depressed portion or a groove) in a part of the first display panel 4311 or the second display panel 4312 at which the first display panel 4311 or the second display panel 4312 is to be bent.

For example, the first display panel 4311 can be formed using an element substrate 4331a and a sealing substrate 4332a, and one or both of the element substrate 4331a and the sealing substrate 4332a can be provided with a cut portion. FIGS. 2A to 2C illustrate the case where the cut portion is provided in the sealing substrate 4332a to form the stress concentration region 4326. In addition, in the structure described here, the scan line driver circuits 4321a and 4321b and a pixel circuit which drives the first display portion 4301 can be formed on the element substrate 4331a so as to be electrically connected to the FPC 4324a.

Similarly, the second display panel 4312 can be formed using an element substrate 4331b and a sealing substrate 4332b, and one or both of the element substrate 4331b and the sealing substrate 4332b can be provided with a cut portion. Note that the scan line driver circuits 4322a and 4322b and a pixel circuit which drives the second display portion 4307 can be formed on the element substrate 4331b so as to be electrically connected to the FPC 4324b.

Further, the stress concentration region 4326 may be provided along a direction in which the first display panel 4311 and the second display panel 4312 are to be bent. For example, in FIG. 2A, when the cut portion is provided from an upper end to a bottom end of the first display panel 4311 and/or the second display panel 4312 along a direction which is parallel or substantially parallel to the binding portion 4308, the direction in which the display panel is bent can be controlled (the display panel can be selectively bent in a direction perpendicular to the binding portion) and the destruction of the signal line driver circuit provided on the FPC can be inhibited.

The stress concentration region 4326 can be provided inside or outside the binding portion 4308. For example, the stress concentration region 4326 is preferably provided outside the binding portion 4308 (e.g., between the binding portion 4308 and the display portion) in the case where the binding portion 4308 is provided so as to be close to the first display panel 4311 or the second display panel 4312 with the first display panel 4311 and the second display panel closed.

In FIGS. 2A to 2C, the signal line driver circuit 4323a controlling the first display portion 4301 and the signal line driver circuit 4323b controlling the second display portion 4307 are formed using different ICs, and the signal line driver circuit 4323a and the signal line driver circuit 4323b are electrically connected to each other through the printed board 4325. However, the present invention is not limited thereto. The signal line driver circuit 4323a and the signal line driver circuit 4323b may be built in one IC.

Next, a structure of the e-book reader which is different from that illustrated in FIGS. 2A to 2C is described with reference to FIGS. 3A to 3C. FIG. 3A is a plan view of the closed e-book reader, FIG. 3B is a cross-sectional view taken along the line A-B of FIG. 3A, and FIG. 3C is a detailed schematic view of the cross section.

FIGS. 3A to 3C illustrate the case where an IC provided in the binding portion 4308 are mounted on the first display panel 4311 and the second display panel 4312 by a chip on glass (COG) method.

More specifically, the signal line driver circuit 4323a controlling the first display portion 4301 is provided on the element substrate 4331a included in the first display panel 4311, the signal line driver circuit 4323b controlling the second display portion 4307 is provided on the element substrate 4331b included in the second display panel 4312, and the signal line driver circuit 4323a and the signal line driver circuit 4323b are electrically connected to each other through the FPCs 4324a and 4324b and the printed board 4325.

As illustrated in FIGS. 3A to 3C, in the case where the signal line driver circuit is provided on the display panel, similarly to the case of FIGS. 2A to 2C, the stress concentration region 4326 is preferably provided for one or both of the first display panel 4311 and the second display panel 4312. In that case, the stress concentration region 4326 is provided in a region which is different from (is provided so as to avoid) the region in which the signal line driver circuit is provided. For example, when the stress concentration region 4326 is provided on the sealing substrate side, the stress which is applied to the signal line driver circuit when the e-book reader is opened (when the first display panel 4311 and/or the second display panel 4312 are/is bent) can be reduced and the destruction of the signal line driver circuit can be inhibited.

Next, a structure of the e-book reader which is different from those illustrated in FIGS. 2A to 2C and FIGS. 3A to 3C is described with reference to FIGS. 4A to 4C. FIG. 4A is a plan view of the closed e-book reader, FIG. 4B is a cross-sectional view taken along the line A-B of FIG. 4A, and FIG. 4C is a detailed schematic view of the cross section.

FIGS. 4A to 4C illustrate an e-book reader of the case where an IC in which a circuit such as a signal line driver circuit is formed is provided on a printed board, and the printed board and a display panel are connected with an FPC.

More specifically, the signal line driver circuit 4323a controlling the first display portion 4301 is provided on a printed board 4327a, the signal line driver circuit 4323b controlling the second display portion 4307 is provided on a printed board 4327b, and the signal line driver circuit 4323a and the signal line driver circuit 4323b are electrically connected to each other through an FPC 4329. The FPC 4329 is electrically connected to the printed board 4327a and the printed board 4327b, the FPC 4324a is electrically connected to the first display panel 4311 and the printed board 4327a, and the FPC 4324b is electrically connected to the second display panel 4312 and the printed board 4327b.

In FIGS. 4A to 4C, since the display panels can be bent with the FPC 4324a and the FPC 4324b, a stress concentration region is not provided for the first display panel 4311 and the second display panel 4312.

Next, examples of the binding portion 4308 and a configuration of a circuit which can be provided in the binding portion 4308 are described with reference to FIG. 5.

Figure 5:
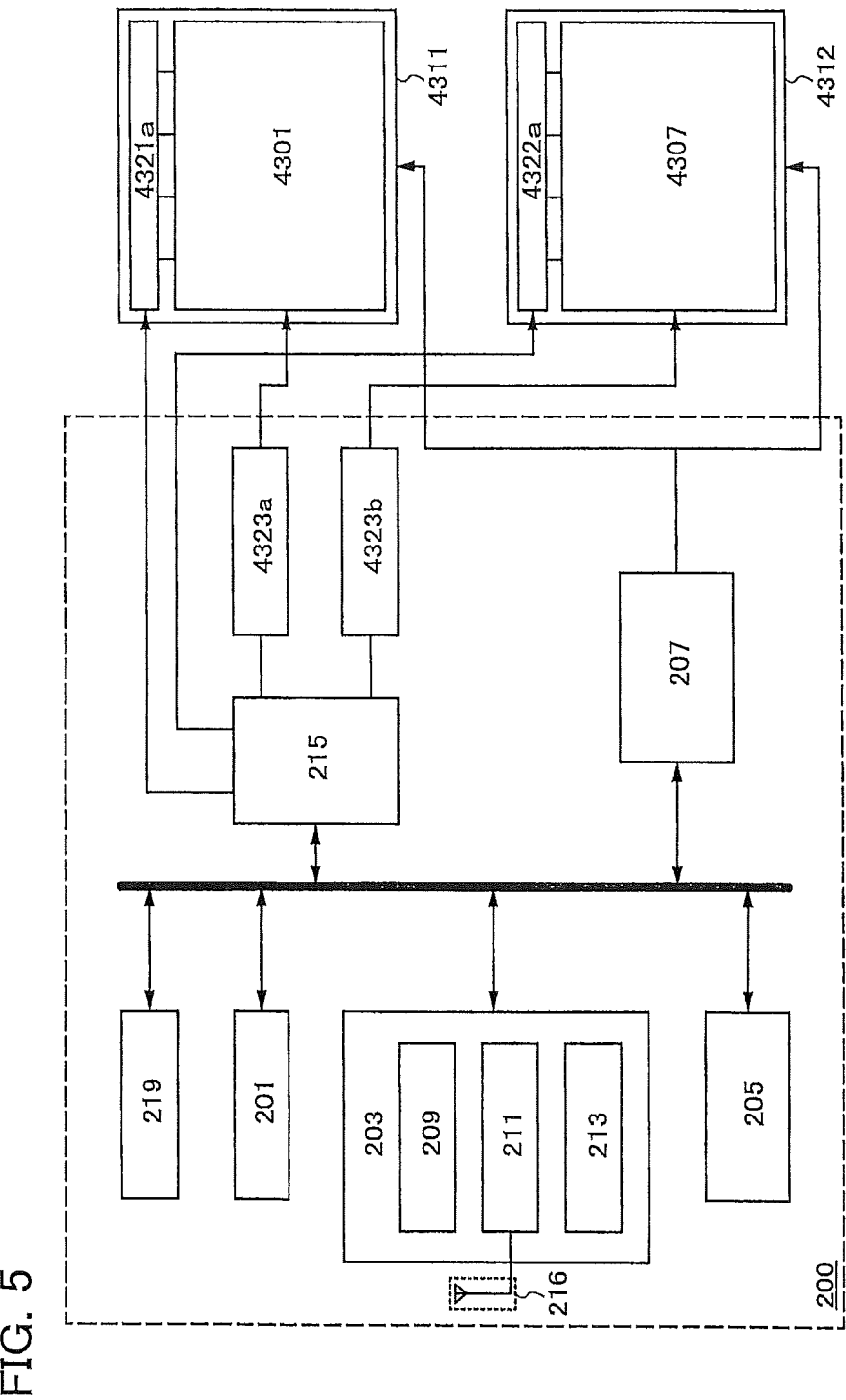
FIG. 5 is a view illustrating one mode of a circuit included in a binding portion of an e-book reader.

FIG. 5 illustrates the case where a display control portion 200 including the signal line driver circuits is incorporated in the binding portion 4308. As described above, the circuit can be formed using an IC formed using an SOI substrate, a semiconductor substrate such as a silicon substrate, or the like.

The display control portion 200 can include a CPU 201, a memory portion 203, a power feeding portion 205, a power supply circuit 207, an image signal generation circuit 215, the signal line driver circuits 4323a and 4323b, an operation portion 219, and the like, which can be connected to each other through an interface or the like. The display control portion 200 is electrically connected to the first display panel 4311 and the second display panel 4312. Although the operation portion 219 is provided in the binding portion 4308 here, the operation portion 219 can be provided on the first display panel 4311 and/or the second display panel 4312.

The CPU 201 controls the operation of the whole e-book reader.

Information to be displayed on the first display portion 4301 and/or the second display portion 4307 is inputted to a data input portion 211 from an external device. Note that the data input portion 211 may be provided with an antenna 216 for transmitting/receiving data to/from an external device. In that case, the data input portion 211 has a function of transferring data received by the antenna 216 or data stored in a memory medium (an external memory 213) to an internal memory 209.

The memory portion 203 can include the internal memory 209, the data input portion 211, and the external memory 213. Information to be displayed on the first display portion 4301 and/or the second display portion 4307, a program for operating the e-book reader, or the like can be recorded in the internal memory 209, the data input portion 211, and the external memory 213.

The internal memory 209 includes a memory portion for storing a program for processing with the CPU 201 a signal outputted to the image signal generation circuit 215 and/or the power supply circuit 207 on the basis of a signal from the power feeding portion 205, the operation portion 219, or the like, data transferred from the data input portion 211, or the like. As examples of the internal memory 209, a dynamic random access memory (DRAM), a static random access memory (SRAM), a mask read only memory (ROM), a programmable read only memory (PROM), and the like are given.

As an example of the external memory 213, a memory medium such as an IC card or a memory card is given.

The power feeding portion 205 includes a secondary battery, a capacitor, and the like. A reduction in size of the power feeding portion 205 is possible when, for example, a lithium battery, preferably, a lithium polymer battery utilizing a gel electrolyte, a lithium ion battery, or the like is used as the secondary battery. Needless to say, any battery can be used as long as it can be charged, and a battery that can be charged and discharged, such as a nickel-metal hydride battery, a nickel-cadmium battery, an organic radical battery, a lead storage battery, an air secondary battery, a nickel-zinc battery, or a silver-zinc battery may be used. As the capacitor, an electric double layer capacitor, a lithium ion capacitor, another capacitor with high capacitance, or the like can be used. The capacitor is preferably used because it is less likely to be deteriorated even when the number of charging and discharging is increased and is excellent in rapid charging. The power feeding portion 205 may be sheet-like, cylinder-like, prism-like, plate-like, coin-like, or the like as appropriate.

Further, the power feeding portion 205 can have a structure to which electric power is wirelessly supplied. In that case, an antenna may be provided for the power feeding portion 205.

The power supply circuit 207 is a circuit for controlling power supply to a display element in accordance with the control by the CPU 201, in order to perform display and non-display on the first display panel 4311 and the second display panel 4312.

The operation portion 219 can be provided with a keyboard, an operation button, or the like. In the case where the operation portion 219 is provided in the first display panel 4311 and/or the second display panel 4312, the first display portion 4301 and/or the second display portion 4307 can function as a touch display, and thus the display portion can also function as an operation portion.

The structure in which the display control portion 200 is incorporated in the binding portion 4308 is illustrated in FIG. 5, and a so-called power device such as a switching power source or a DC-DC converter may further be provided.

Further, in the e-book reader illustrated in FIG. 5, by operation of the operation portion 219, power input and switching of display can be performed. Further, the e-book reader can be operated in such a manner that the first display portion 4301 and/or the second display portion 4307 are/is touched with a finger or an input pen to be treated as a touch display.

As described above, when the display control portion 200 is incorporated in the binding portion 4308, the display control portion 200 can be protected by a housing. In addition, a reduction in thickness of the e-book reader is possible.

In Embodiments 1 and 2, the scan line driver circuits 4321*a* and 4321*b* are provided on the first display panel 4311 along the first display portion 4301 in a direction perpendicular to the binding portion 4308, and the scan line driver circuits 4322*a* and 4322*b* are provided on the second display panel 4312 along the second display portion 4307 in a direction perpendicular to the binding portion 4308. However, the present invention is not limited thereto.

Figure 6A:
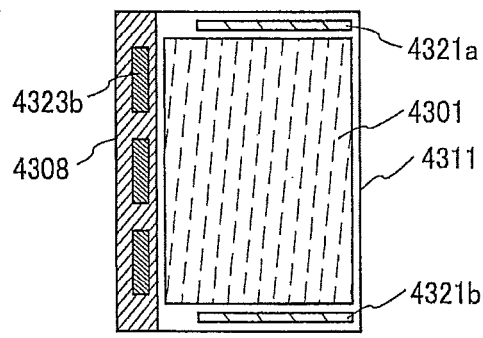
FIGS. 6A to 6D are views each illustrating one mode of an e-book reader.

For example, as illustrated in FIG. 6A, in the first display panel 4311, the scan line driver circuits 4321*a* and 4321*b* can be provided so that the distance between the scan line driver circuits 4321*a* and 4321*b* and the binding portion 4308 is larger than that between the first display portion 4301 and the binding portion 4308. In general, since the scan line driver circuits 4321*a* and 4321*b* each have a higher concentration of elements than the pixel circuit, the scan line driver circuits 4321*a* and 4321*b* are not provided in the part at which the first display panel 4311 is bent. Accordingly, the destruction of the scan line driver circuits 4321*a* and 4321*b* can be inhibited.

Figure 6B:
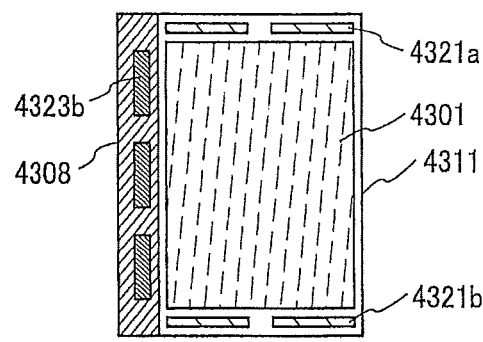
Figure 6C:
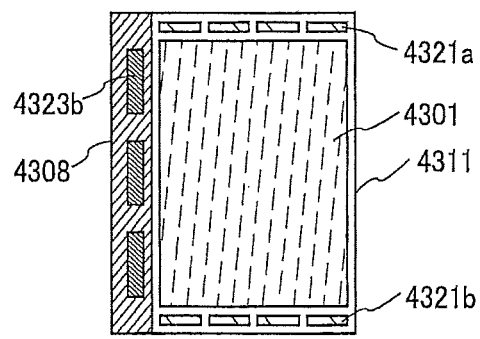

As illustrated in FIGS. 6B and 6C, each of the scan line driver circuits 4321*a* and 4321*b* can be divided into a plurality of circuit portions, and the plurality of circuit portions can be spaced from each other. Consequently, even in the case where the first display panel 4311 is bent, stress applied to the scan line driver circuits 4321*a* and 4321*b* can be reduced and the destruction of the scan line driver circuits 4321*a* and 4321*b* can be inhibited. In FIG. 6B, each of the scan line driver circuits 4321*a* and 4321*b* is divided into two circuit portions. In FIG. 6C, each of the scan line driver circuits 4321*a* and 4321*b* is divided into four circuit portions. However, the number of divided scan line driver circuits is not limited thereto.

Figure 6D:
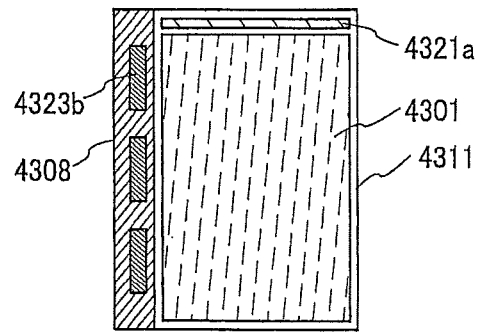

As illustrated in FIG. 6D, in the first display panel 4311, the scan line driver circuit (either one of the scan line driver circuit 4321*a* and the scan line driver circuit 4321*b*) may be provided at one of the edges. This makes it possible to reduce the frame size of the e-book reader.

Note that the structures illustrated in FIGS. 6A to 6D can also be applied to the second display panel 4312.

Embodiment 2 can be implemented by being combined with any of the structures described in the other embodiments as appropriate.

Embodiment 3

In Embodiment 3, an example of a function of the above embodiments in the case where an e-book reader including a plurality of flexible display panels is opened and bent to be used will be described with reference to FIGS. 7A and 7B, FIGS. 8A to 8C, FIGS. 9A to 9C, and FIGS. 10A to 10C.

Figure 7A:
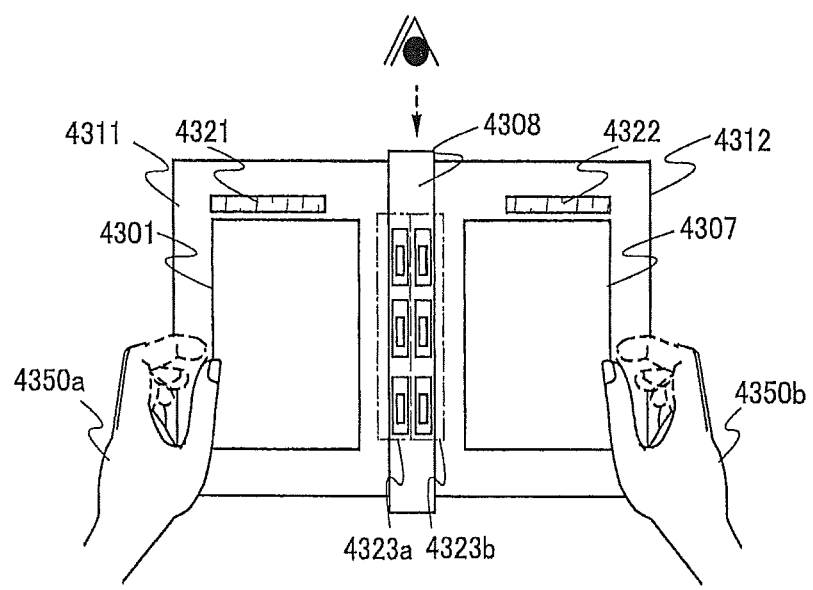
FIGS. 7A and 7B are views illustrating one mode of an e-book reader.
Figure 7B:
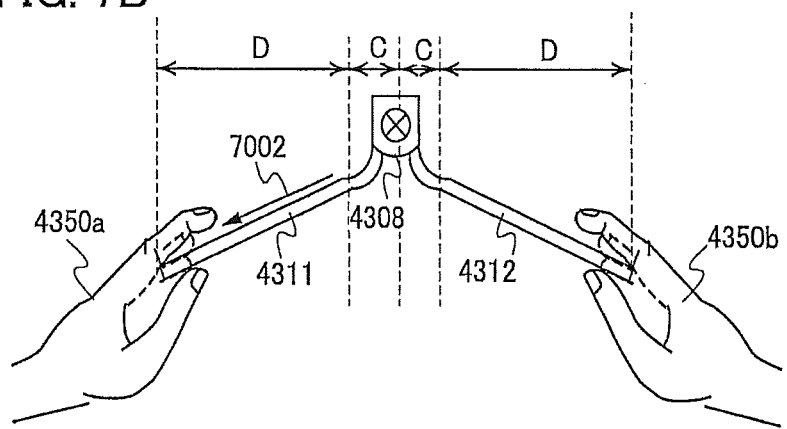

First, a front plan view of FIG. 7A illustrating the case where a user opens an e-book reader to use and a top plan view of FIG. 7B of the case of FIG. 7A are described.

The e-book reader illustrated in FIG. 7A includes the first display panel 4311, the second display panel 4312, and the binding portion 4308. The first display panel 4311 includes the first display portion 4301, and display on the first display portion 4301 is controlled by the scan line driver circuit 4321 for supplying a scan signal to the first display portion 4301 and the signal line driver circuit 4323*a* for supplying an image signal to the first display portion 4301. The second display panel 4312 includes the second display portion 4307, and display on the second display portion 4307 is controlled by the scan line driver circuit 4322 for supplying a scan signal to the second display portion 4307 and the signal line driver circuit 4323b for supplying an image signal to the second display portion 4307. Further, user's hands 4350a and 4350b gripping the edges of the first display panel 4311 and the second display panel 4312 are also illustrated in FIG. 7A. Further, in the front plan view of FIG. 7A, a line of sight at the time when the user is looking at the e-book reader illustrated in the top plan view of FIG. 7B from above is also illustrated.

In the top plan view of FIG. 7B, the first display panel 4311, the second display panel 4312, and the binding portion 4308 are illustrated. As illustrated in FIG. 7B, when the user opens the e-book with his/her hands 4350a and 4350b to use, bending portions (hereinafter, referred to as "bending portions C") are formed in areas indicated by arrows C and non-bending portions (hereinafter, referred to as "non-bending portions D") are formed in areas indicated by arrows D in the flexible display panels.

Note that in FIG. 7B, as an example, description is made on the case where the bending portions C of the first display panel 4311 and the second display panel 4312 are positioned on the side near the binding portion 4308 and the non-bending portions D of the first display panel 4311 and the second display panel 4312 are positioned on the side away from the binding portion 4308. The bending state of the display panel is different between the bending portion C and the non-bending portion D depending on the structure of the binding portion 4308 and a material of a substrate included in the display panel. For the above reason, the bending portions C of the first display panel 4311 and the second display panel 4312 may be positioned on the side away from the binding portion 4308 and the binding portions B of the first display panel 4311 and the second display panel 4312 may be positioned on the side near the binding portion 4308.

Note that since the e-book reader has a structure in which the display panels are fastened together by the binding portion 4308, the bending portion C and the non-bending portion D are formed at edge portions of each of the first display panel 4311 and the second display panel 4312 which are in a direction (indicated by an arrow 7002 in FIG. 7B) perpendicular to a direction in which the binding portion 4308 extends. Thus, by the binding portion 4308, the signal line driver circuit 4323a and the signal line driver circuit 4323b can be prevented from destruction caused by the bending of the display panels. Further, each of the scan line driver circuit 4321 and the scan line driver circuit 4322 which are provided in the non-bending portions D in FIGS. 7A and 7B can be manufactured in the process of forming the display portion, leading to a reduction in cost and a reduction of leading of a wiring to the display portion. Note that a plurality of bending portions C and/or a plurality of non-bending portions D may be provided, and the bending portion C and the non-bending portion D may be provided alternately. A stress concentration region may be provided for the display panel to artificially form the bending portion C and the non-bending portion D.

FIGS. 8A to 8C, like FIG. 7A, are front plan views illustrating the case where a user opens the e-book reader to use. The arrangement of the scan line driver circuit 4321 and the scan line driver circuit 4322 each with respect to the bending portion C and the non-bending portion D is described with reference to FIGS. 8A to 8C.

In FIG. 8A, the bending portion C is positioned on the side near the binding portion 4308 while the bending portion D is positioned on the side away from the binding portion 4308. Accordingly, each of the scan line driver circuit 4321 and the scan line driver circuit 4322 is positioned in the non-bending portion D which is on the side away from the binding portion 4308. Note that a scan signal may be supplied to a pixel TFT 4352 in the display portion by leading of a wiring extending from each of the scan line driver circuit 4321 and the scan line driver circuit 4322, to each scan line of the display portion. Note that a control signal such as a clock signal for driving each of the scan line driver circuit 4321 and the scan line driver circuit 4322 is supplied through a wiring extending from an image signal generation circuit in the binding portion 4308. A wiring for electrically connecting circuits is formed by microfabrication of a metal film or the like, and a semiconductor film of a transistor included in the scan line driver circuit is formed using a semiconductor material such as a silicon film. A metal film has higher ductibility and less damage caused by bending than a semiconductor material. For the above reason, a wiring which is connected to the scan line driver circuit is provided in a portion corresponding to the bending portion C and the transistor included in the scan line driver circuit is provided in a portion corresponding to the non-bending portion D, whereby damage to the semiconductor film of the transistor caused by bending can be reduced. As a result, the arrangement of the scan line driver circuit 4321 and the scan line driver circuit 4322 as in FIG. 8A makes it possible to inhibit destruction of the circuit at the time when a user opens the e-book reader with his/her hands 4350a and 4350b to use.

FIG. 8B illustrates a structure in which the bending portions C and the non-bending portions D are provided alternately from the side near the binding portion 4308 and the side away therefrom. Accordingly, the scan line driver circuit 4321 and the scan line driver circuit 4322 each are divided into plural circuits and the plural circuits are spaced from each other in the non-binding portions B. Note that a scan signal may be supplied to the pixel TFT 4352 in the display portion by leading of a wiring extending from each of the scan line driver circuit 4321 and the scan line driver circuit 4322, to each scan line of the display portion. Note that a control signal such as a clock signal for driving each of the scan line driver circuit 4321 and the scan line driver circuit 4322 is supplied through a wiring extending from an image signal generation circuit in the binding portion 4308. A signal which is transmitted between pulse signal generating circuits such as flip flops included in the scan line driver circuit may be supplied through a wiring. A wiring for electrically connecting circuits is formed by microfabrication of a metal film or the like, and a semiconductor film of a transistor included in the scan line driver circuit is formed using a semiconductor material such as a silicon film. A metal film has higher ductibility and less damage caused by bending than a semiconductor material. For the above reason, a wiring which is connected to the scan line driver circuit is provided in a portion corresponding to the bending portion C and the transistor included in the scan line driver circuit is provided in a portion corresponding to the non-bending portion D, whereby damage to the semiconductor film of the transistor caused by bending can be reduced. Further, in FIG. 8B, the scan line driver circuit is divided into plural circuits and the plural circuits are spaced from each other, whereby stress applied to the scan line driver circuits at the time of bending can be dispersed. As a result, the arrangement of the scan line driver circuit 4321 and the scan line driver circuit 4322 as in FIG. 8B makes it possible to more effectively inhibit destruction of the circuit at the time when a user opens the e-book reader with his/her hands 4350a and 4350b to use.

Note that in FIG. 8B, the scan line driver circuits 4321 may be provided on opposite sides in the display portion as the scan line driver circuits 4321a and the scan line driver circuit 4321b, and the scan line driver circuits 4322 may be provided on opposite sides in the display portion as the scan line driver circuits 4322a and the scan line driver circuit 4322b so as to obtain a redundant structure or spread the function of outputting a scan signal. FIG. 8C is a view illustrating a structure in which the scan line driver circuits described in FIG. 8B are provided on the opposite sides in the display panel. Scan signals are supplied to the pixel TFT 4352 by the scan line driver circuits 4321a and the scan line driver circuits 4321b provided on opposite sides and the scan line driver circuits 4322a and the scan line driver circuits 4322b provided on the opposite sides, whereby the number of a pulse signal generation circuit such as a flip flop included in the scan line driver circuit can be reduced; thus, destruction of the circuits at the time when a user opens the e-book reader with his/her hands 4350a and 4350b to use can be inhibited.

Advantages of arranging the scan line driver circuits not in the regions corresponding to the bending portions C but in the regions corresponding to the non-bending portions D are described using FIGS. 8B and 8C illustrating the specific examples. The structures make it possible to disperse stress applied to the scan line driver circuits at the time of bending and to inhibit destruction of the circuits at the time when a user opens the e-book reader with his/her hands 4350a and 4350b to use.

Next, an example of providing a stress concentration region for artificially for forming the bending portion C and the non-bending portion D in the display panel in the case where the plurality of driver circuits are provided so as to be separated from each other as described in FIGS. 8B and 8C is described with reference to FIGS. 9A to 9C and FIGS. 10A to 10C.

Figure 9A:
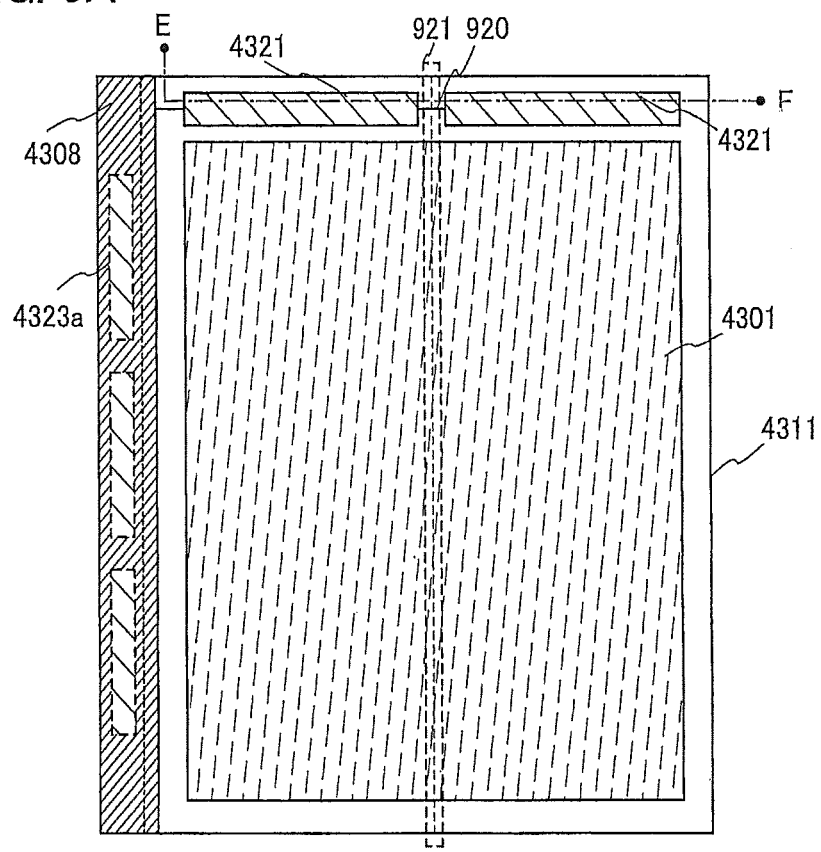
FIGS. 9A to 9C are views each illustrating one mode of an e-book reader.
Figure 9B:
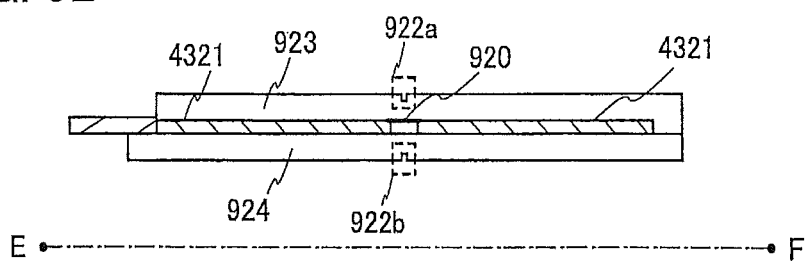
Figure 9C:
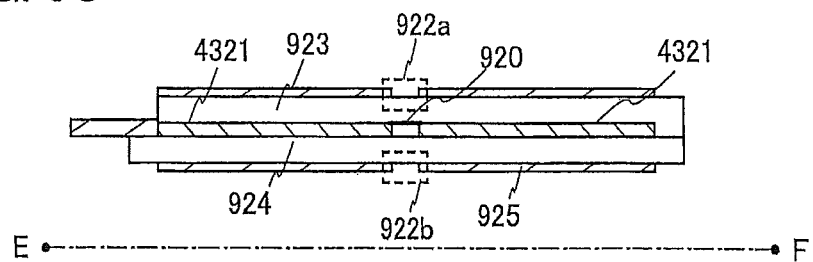

In FIG. 9A, the first display panel 4311, the binding portion 4308, the first display portion 4301, the scan line driver circuit 4321, and the signal line driver circuit 4323a are illustrated. The scan line driver circuit 4321 is divided into two circuits and the two circuits are spaced from each other with a wiring 920 therebetween. It is preferable that a stress concentration region 921 be formed so as to overlap the wiring 920. FIG. 9B is an example of a cross-sectional view taken in a direction perpendicular to the binding portion 4308. In FIG. 9B, a cut portion 922a and a cut portion 922b may be provided for a sealing substrate 923 and an element substrate 924 respectively in the stress concentration region 921 which overlaps the wiring 920. Note that as illustrated in FIG. 9C, reinforcing plates 925 may be attached onto the scan line driver circuits 4321 of the element substrate 924 and the sealing substrate 923 to form the cut portion 922a and the cut portion 922b. Note that the cut portion 922a and the cut portion 922b may be provided so as to be parallel to the long axis of the binding portion 4308 or may be provided partly.

Note that the stress concentration means a region where stress formed by deformation of a material due to cutting or the like or a change in the strength against bending or extension due to attachment of a material or the like is concentrated.

Note that division of the scan line driver circuit means that the scan line driver circuit is divided into plural circuits in such a manner that repeated regions in the scan line driver circuit, in each of which a wiring and a circuit element such as a TFT coexist are divided by regions used for wiring leading.

Figure 10A:
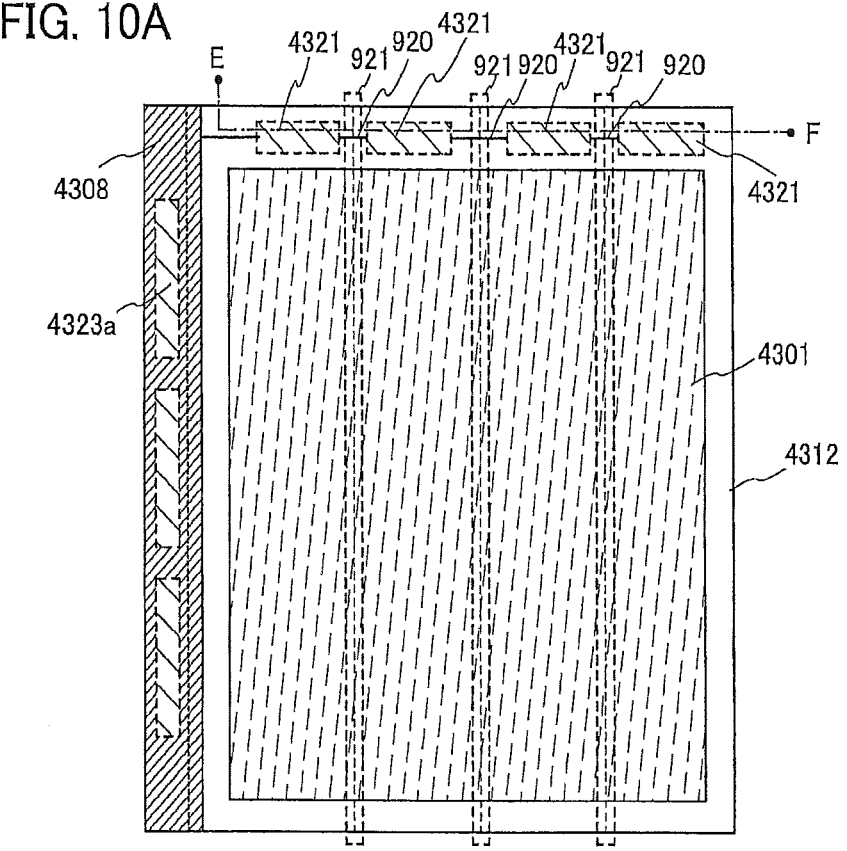
FIGS. 10A to 10C are views each illustrating one mode of an e-book reader.
Figure 10B:
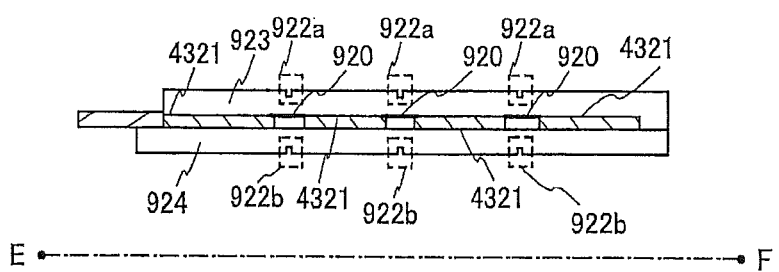
Figure 10C:
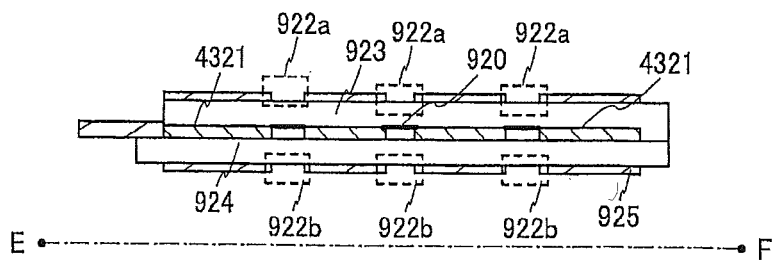

Further, in FIG. 10A, as in FIG. 9A, the first display panel 4311, the binding portion 4308, the first display portion 4301, the scan line driver circuit 4321, and the signal line driver circuit 4323a are illustrated. The scan line driver circuit 4321 is divided into four circuits and the four circuits are spaced from each other with a plurality of wirings 920 therebetween. It is preferable that the stress concentration regions 921 be formed to overlap the plurality of wirings 920. FIG. 10B is an example of a cross-sectional view taken in a direction perpendicular to the binding portion 4308. In FIG. 10B, a plurality of cut portions 922a and a plurality of cut portions 922b may be provided for the sealing substrate 923 and the element substrate 924 respectively in the stress concentration regions 921 which overlap the wirings 920. Note that as illustrated in FIG. 10C, the reinforcing plates 925 may be attached onto the scan line driver circuits 4321 of the element substrate 924 and the sealing substrate 923 to form the plurality of cut portions 922a and the plurality of cut portions 922b. Note that the plurality of cut portions 922a and the plurality of cut portions 922b may be provided so as to be parallel to the long axis of the binding portion 4308 or may be provided partly.

Note that the number of divisions of the scan line driver circuit illustrated in FIGS. 9A to 9C and FIGS. 10A to 10C are examples for description; the scan line driver circuit is divided as appropriate into any number of circuits to be provided.

As described above, the structure of this embodiment makes it possible to more effectively inhibit destruction of the scan line driver circuit at the time when a user opens the e-book reader to use. In addition, according to the structure of this embodiment, the stress concentration region is provided for the display panel in advance by the cut portion or the like, destruction of the scan line driver circuit can be inhibited more effectively.

Embodiment 3 can be implemented by being combined with any of the structures described in the other embodiments as appropriate.

Embodiment 4

Figure 11A:
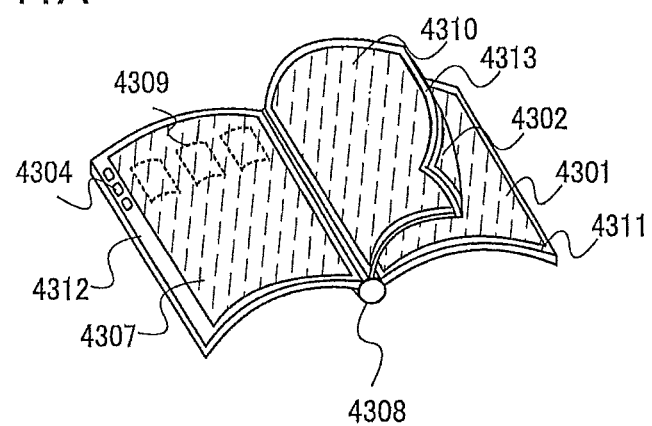
FIGS. 11A and 11B are views illustrating one mode of an e-book reader.
Figure 11B:
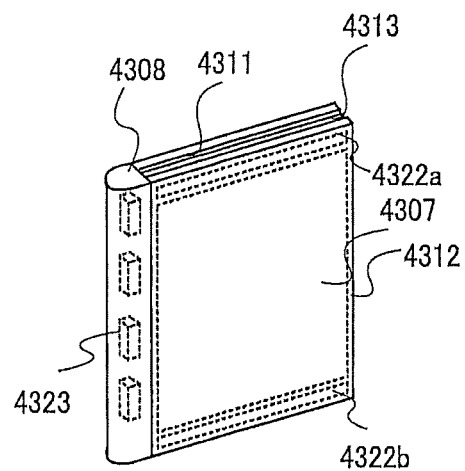
Figure 12:
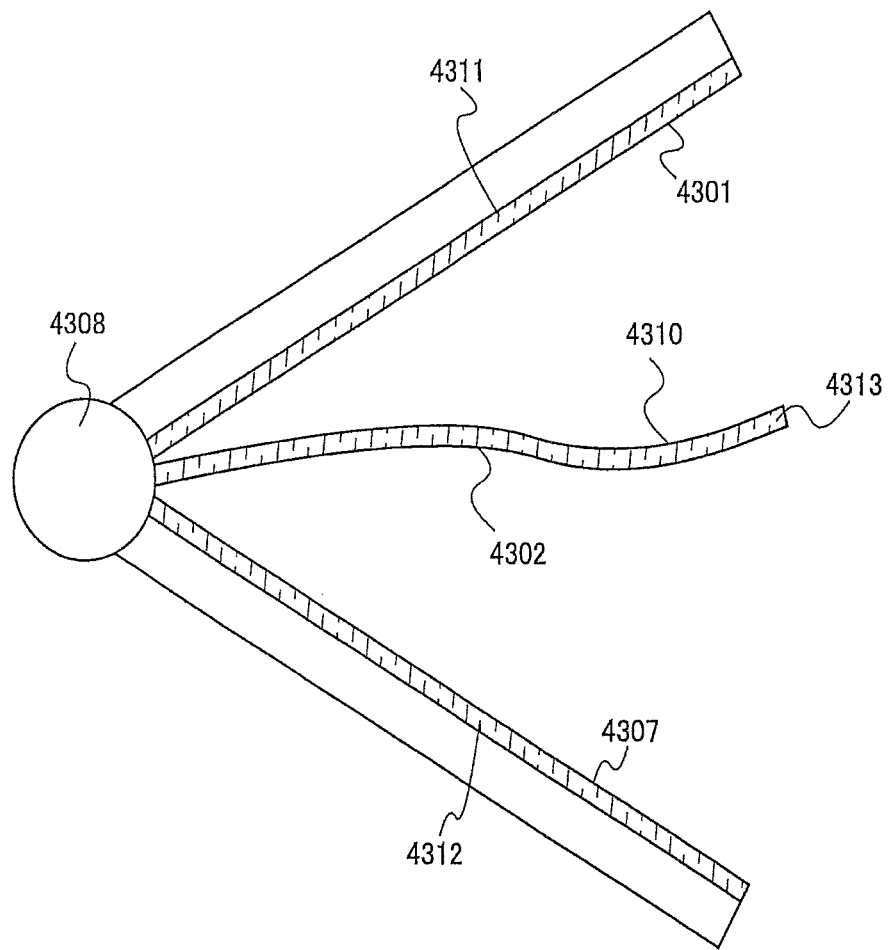
FIG. 12 is a view illustrating one mode of an e-book reader.

In Embodiment 4, an example of an e-book reader which has a structure in which a third panel of dual display type is provided between the first display panel 4311 and the second display panel 4312 in addition to the structure described in Embodiment 1 in which the plurality of display panels are included will be described. FIG. 11A illustrates an opened e-book reader and FIG. 11B illustrates a closed e-book reader. In addition, FIG. 12 is a cross-sectional view in a lateral direction.

The e-book reader illustrated in FIGS. 11A and 11B includes the first display panel 4311 including the first display portion 4301, the second display panel 4312 including an operation portion 4304 and the second display portion 4307, a third display panel 4313 including a third display portion 4302 and a fourth display portion 4310, and the binding portion 4308 provided at edges of the first display panel 4311, the second display panel 4312, and the third display panel 4313. The third display panel 4313 is interposed between the first display panel 4311 and the second display panel 4312. The e-book reader illustrated in FIGS. 11A and 11B includes four display screens: the first display portion 4301, the second display portion 4307, the third display portion 4302, and the fourth display portion 4310.

The first display panel 4311, the second display panel 4312, and the third display panel 4313 are flexible and thus are easily bent. Further, when a plastic substrate is used for each of the first display panel 4311 and the second display panel 4312 and a thin film is used for the third display panel 4313, a thin e-book reader can be obtained. In other words, an e-book reader in which the third display panel 4313 is bent more easily than the first display panel 4311 and the second display panel 4312, like the e-book reader the cross section of which in a lateral direction is illustrated as an example in FIG. 12 can be obtained. When hard display panels are provided outside the third display panel 4313, the e-book reader can be handled like a book and the destruction of the third display panel 4313 can be inhibited.

The third display panel 4313 is a dual display panel including the third display portion 4302 and the fourth display portion 4310. For the third display panel 4313, a display panel of a dual emission type may be used, or display panels of a one-side emission type may be attached. Alternatively, two liquid crystal display panels with a backlight (preferably, a thin EL panel) interposed therebetween may be used.

Further, the e-book reader illustrated in FIGS. 11A and 11B includes scan line driver circuits (not illustrated) controlling the first display portion 4301; scan line driver circuits 4322a and 4322b controlling the second display portion 4307; scan line driver circuits (not illustrated) controlling the third display portion 4302 and/or the fourth display portion 4310; and signal line driver circuit 4323 controlling the first display portion 4301, the second display portion 4307, the third display portion 4302, and/or the fourth display portion 4310. Note that the scan line driver circuits 4321a and 4321b are provided in the first display panel 4311, the scan line driver circuits 4322a and 4322b are provided in the second display panel 4312, and the signal line driver circuit 4323 is provided inside the binding portion 4308.

Further, in the e-book reader illustrated in FIGS. 11A and 11B, the second display panel 4312 includes the operation portion 4304 which functions as a switch for turning on, a switch for switching displays, or the like.

Further, the input operation of the e-book reader illustrated in FIGS. 11A and 11B is performed when the first display portion 4301 or the second display portion 4307 is touched with a finger or an input pen or when the operation portion 4304 is operated. Note that a display button 4309 displayed on the second display portion 4307 is illustrated in FIG. 11A, and data input can be performed when the display button is touched with a finger or the like.

Further, as an usage example of the e-book reader in which the third display panel 4313 is interposed, which is illustrated in FIGS. 11A and 11B, it is convenient to read text on the first display portion 4301 and the fourth display portion 4310 and to see drawings on the second display portion 4307 and the third display portion 4302. Since images cannot be displayed on the third display portion 4302 and the fourth display portion 4310 at the same time, the display on the third display portion 4302 is switched to the display on the fourth display portion 4310 when a page is turned.

Further, after data on the first display portion 4301 and the third display portion 4302 are read in this order, the fourth display portion 4310 and the second display portion 4307 display the next page when the third display panel 4313 is turned at a certain angle. In addition, after data on the fourth display portion 4310 and the second display portion 4307 are read, the third display portion 4302 and the first display portion 4301 display data on the next page when the third display panel 4313 is turned at a certain angle. This makes the switching of display invisible, resulting in a reduction in visual discomfort or the like.

Next, an example of a specific structure of the e-book reader including the first display panel 4311, the second display panel 4312, and the third display panel 4313 is described with reference to FIGS. 13A and 13B, similarly to the description with reference to FIGS. 2A and 2B. Note that FIG. 13A is a plan view of the closed e-book reader and FIG. 13B illustrates a cross section taken along the line A-B of FIG. 13A.

Figure 13A:
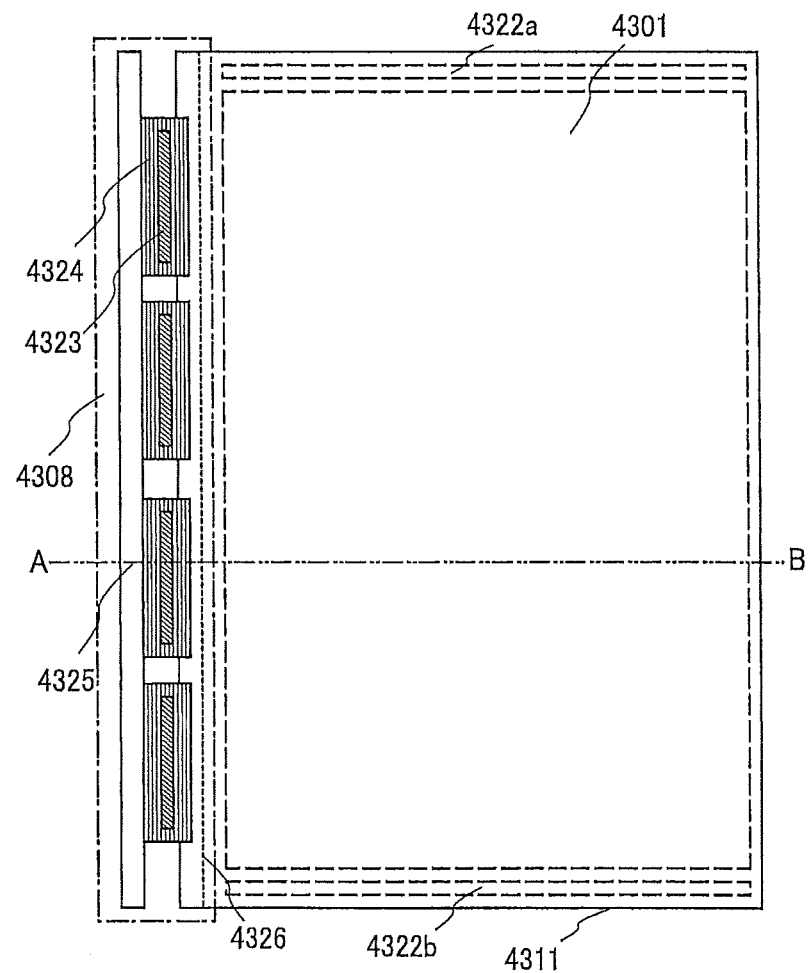
FIGS. 13A and 13B are views illustrating one mode of an e-book reader.
Figure 13B:
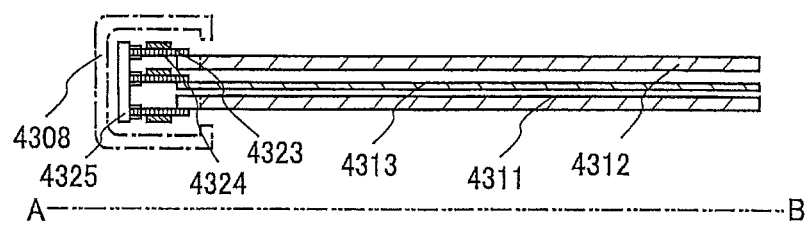

As for the e-book reader illustrated in FIGS. 13A and 13B, the binding portion 4308 is formed using a housing with a hollow, and the signal line driver circuit is provided inside the housing. Here, the signal line driver circuit 4323 is formed using an IC, and the IC is provided inside the binding portion 4308. The IC can be formed using an SOI substrate, a semiconductor substrate such as a silicon substrate, or the like. Needless to say, a circuit (e.g., a CPU or a memory) other than the signal line driver circuit can be provided for the IC.

Further, FIGS. 13A and 13B illustrate a case where the IC provided inside the binding portion is mounted on a flexible printed circuit (FPC) by a tape automated bonding (TAB) method.

More specifically, an IC in which the signal line driver circuit 4323 controlling the first display portion 4301 is formed is provided on the FPC 4324; the IC in which the signal line driver circuit 4323 controlling the second display portion 4307 is formed is similarly provided on the FPC 4324; an IC in which a signal line driver circuit 4323 controlling the third display portion 4302 and the fourth display portion 4310 is formed is provided on the FPC 4324; and the signal line driver circuits 4323 are electrically connected to each other via the printed board 4325. The FPCs 4324 are electrically connected to the first display panel 4311, the second display panel 4312, and the printed board 4325.

In FIGS. 13A and 13B, the printed board 4325 can be provided so as to be attached to the housing forming the binding portion 4308.

In the case where the signal line driver circuit is provided on the FPC as illustrated in FIGS. 13A and 13B, the stress concentration region 4326 is preferably provided for one or both of the first display panel 4311 and the second display panel 4312 as described in FIG. 2C. The provision of the stress concentration region 4326 for the display panel makes it possible to reduce the stress which is applied to the FPC 4324 when the e-book reader is opened (when the first display panel 4311 and/or the second display panel 4312 are/is bent) and to inhibit the destruction of the signal line driver circuit 4323 provided on the FPC 4324. Note that since the third display panel 4313 is formed using a thin film, the e-book reader has enough flexibility to be used while being opened; consequently, the e-book reader can be handled like a book.

Figure 14A:
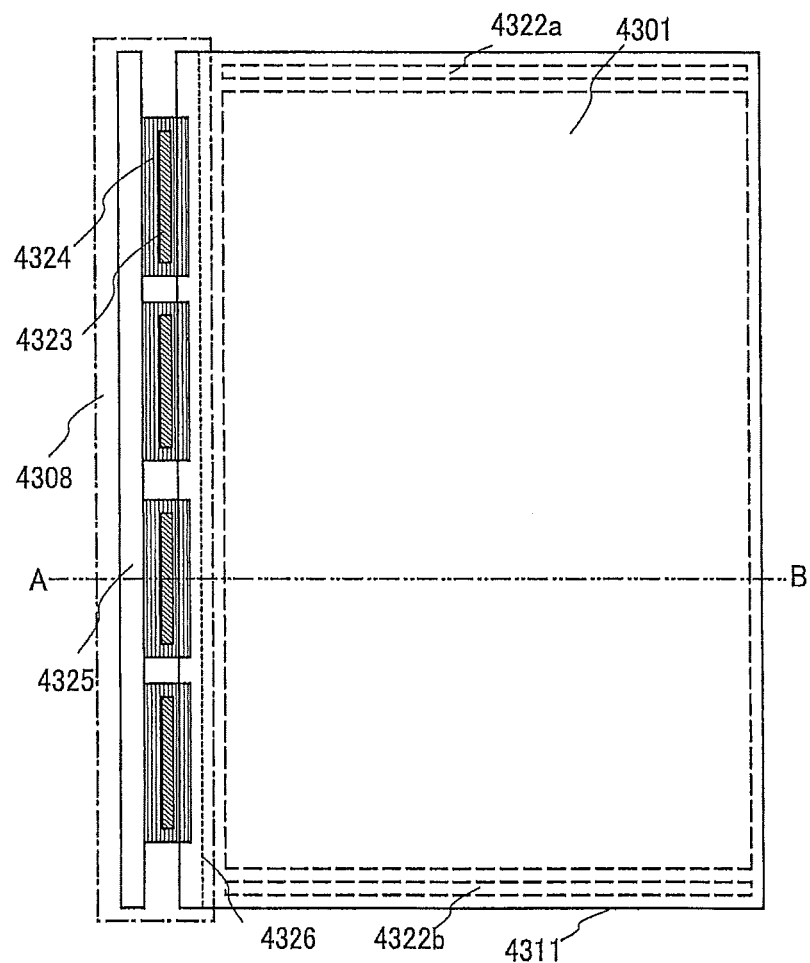
FIGS. 14A and 14B are views illustrating one mode of an e-book reader.

Next, a structure of the e-book reader which is different from that illustrated in FIGS. 13A and 13B is described with reference to FIGS. 14A and 14B. FIG. 14A is a plan view of the closed e-book reader and FIG. 14B illustrates a cross section taken along the line A-B of FIG. 14A.

Figure 14B:
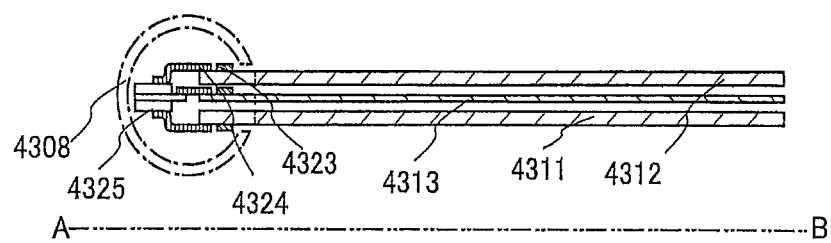

FIGS. 14A and 14B illustrate an e-book reader of the case where an IC which is to be provided in the binding portion 4308 is mounted on the first display panel 4311 and the second display panel 4312 by a chip on glass (COG) method.

More specifically, an IC in which the signal line driver circuit 4323 controlling the first display portion 4301 is formed is provided on an element substrate which is included in the first display panel 4311; an IC in which the signal line driver circuit 4323 controlling the second display portion 4307 is formed is similarly provided on an element substrate included in the second display panel 4313; an IC in which the signal line driver circuit 4323 controlling the third display portion 4302 and the fourth display portion 4310 is formed is provided on an element substrate included in the third display panel 4313; and the signal line driver circuits 4323 are electrically connected to each other via the FPCs 4324 and the printed boards 4325.

Next, a structure of the e-book reader which is different from that illustrated in FIGS. 13A and 13B and FIGS. 14A and 14B is described with reference to FIGS. 15A and 15B.

Figure 15A:
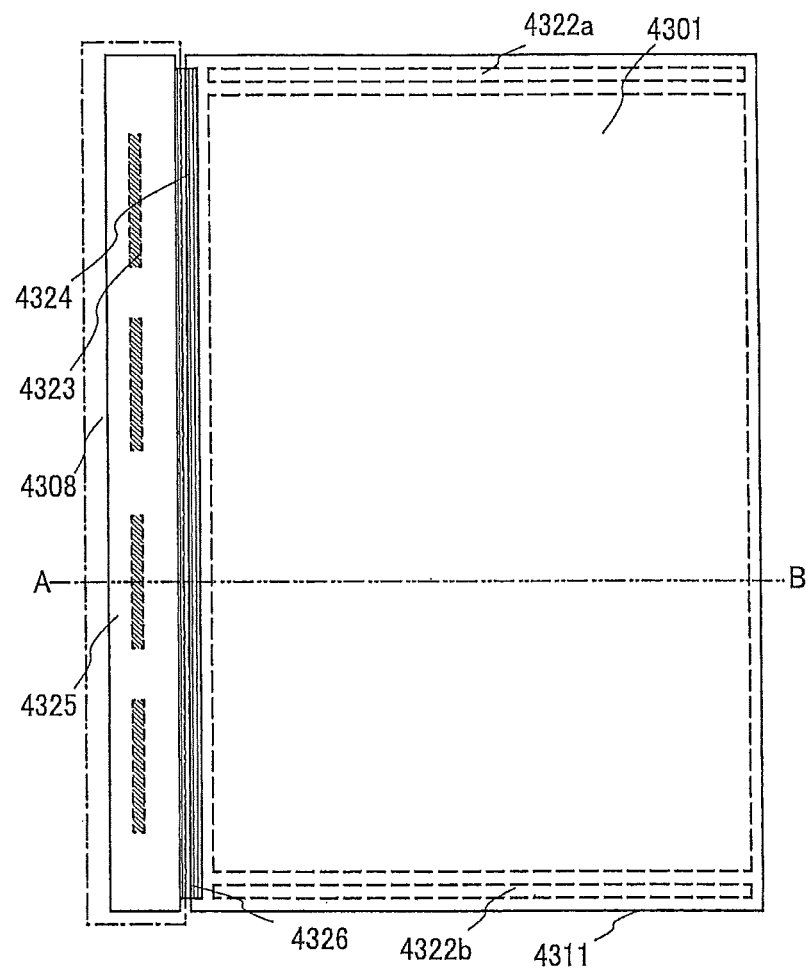
FIGS. 15A and 15B are views illustrating one mode of an e-book reader.
Figure 15B:
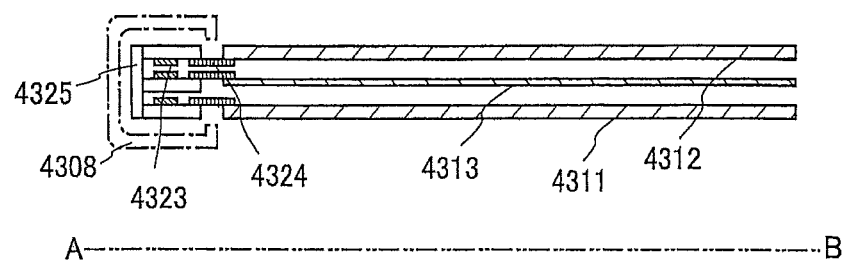

FIG. 15A is a plan view of a closed e-book reader and FIG. 15B illustrates a cross section taken along the line A-B of FIG. 15A.

FIGS. 15A and 15B illustrates an e-book reader of the case where an IC in which a circuit such as a signal line driver circuit is formed is provided on a printed board, and the printed board and a display panel are connected with an FPC.

More specifically, an IC in which the signal line driver circuit 4323 controlling the first display portion 4301 is formed is provided on the printed board 4325; an IC in which the signal driver circuit 4323 controlling the second display portion 4307 is formed is similarly provided on the printed board; an IC in which the signal line driver circuit 4323 controlling the third display portion 4302 and the fourth display portion 4310 is formed is provided on the element substrate included in the third display panel 4313; and the signal line driver circuits 4323 are electrically connected to each other via the FPC 4324. The FPCs 4324 are electrically connected to the printed boards 4325.

In FIGS. 15A and 15B, since the display panel can be bent with the FPC 4324, a bending portion is not necessarily provided.

Next, a structure of the e-book reader in which the third panel of a dual display type is provided between the first display panel 4311 and the second display panel 4312 and a function thereof are described using a block diagram or the like. Note that the e-book reader in this embodiment is particularly suitable for an e-book reader in which a self-luminous light-emitting element, a liquid crystal element controlling transmission of light from a backlight or the like, or the like is used as a light-emitting element in a display panel. Note that another display element such as an electrophoretic element can be used as a display element of the e-book reader.

Figure 16:
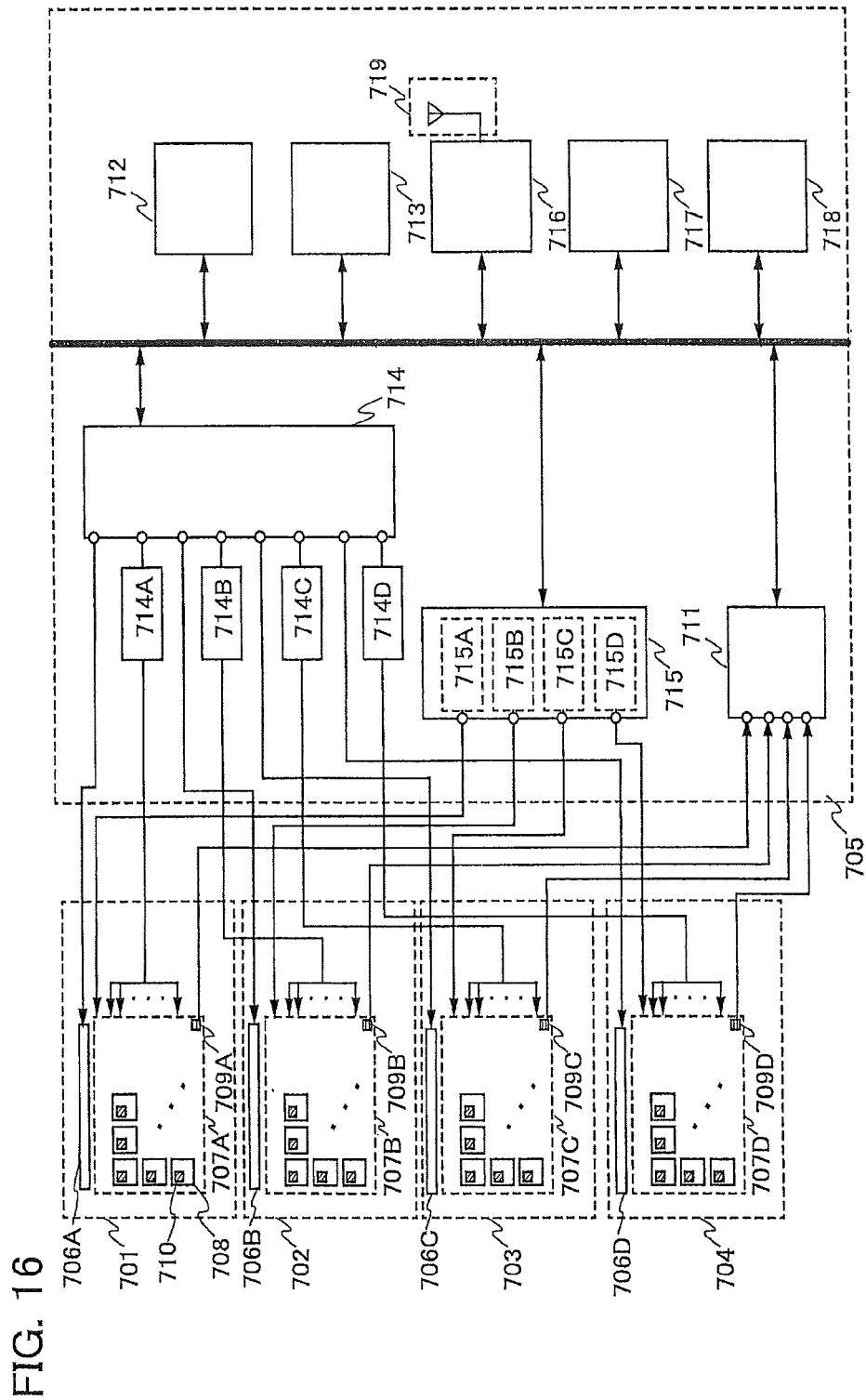
FIG. 16 is a block diagram illustrating one mode of an e-book reader.

FIG. 16 is a block diagram of an e-book reader described in this embodiment. The e-book reader illustrated in FIG. 16 includes a first display panel 701, a second display panel 702, a third display panel 703, a fourth display panel 704, and a display control portion 705. The first display panel 701 includes a scan line driver circuit 706A and a first display portion 707A. The second display panel 702 includes a scan line driver circuit 706B and a second display portion 707B. The third display panel 703 includes a scan line driver circuit 706C and a third display portion 707C. The fourth display panel 704 includes a scan line driver circuit 706D and a fourth display portion 707D.

Note that, as described in any of the above embodiments, the first display panel 701 to the fourth display panel 704 each are flexible and are fastened together by the binding portion in which the display control portion including the signal line driver circuit described in any of the above embodiments is provided.

Note that when a dual-emission type display panel is used as the third display panel 703 and the fourth display panel 704, the third panel 703 can include both the third display portion 707*c* and the fourth display portion 707D, resulting in reduction in thickness and cost of the e-book reader.

The first display portion 707A to the fourth display portion 707D each include a plurality of pixels 708 each of which includes a pixel circuit 710 for controlling a display element. Further, each of the pixel circuits 710 includes a thin film transistor or the like. When the pixel circuits 710 are formed at a time, a reduction in cost can be achieved. In addition, the first display portion 707A includes a photo sensor 709A, the second display portion 707B includes a photo sensor 709B, the third display portion 707C includes a photo sensor 709C, and the fourth display portion 707D includes a photo sensor 709D.

Note that the scan line driver circuits 706A to 706D each supply a scan signal to the pixel circuit 710 in the pixel 708.

The photo sensors 709A to 709D each have a function of detecting a state in which data on the first display panel 701 and the third display panel 703 are looked at or a state in which data on the second display panel 702 and the fourth display panel 704 are looked at. The function described in this embodiment can be realized by a gradient detection portion provided for the display panel or the like or another opening-closing detection unit.

Note that the photo sensor 709C and/or the photo sensor 709D can be omitted when the accuracy of illuminance of the photo sensor 709A and/or the photo sensor 709B is increased. Note that a light-shielding portion is preferably provided instead of the photo sensor 709C and/or the photo sensor 709D, in which case the accuracy of illuminance of the photo sensor 709A and/or the photo sensor 709B and detection by the photo sensor is possible even in the case where a light-transmitting substrate is used.

Note that the photo sensors 709A to 709D each may be formed as a photosensor formed with a photodiode, a phototransistor, or the like over a substrate over which the thin film transistor included in the pixel circuit 710 is formed. When the photo sensors 709A to 709D are formed together with the thin film transistors, a reduction in cost of the e-book reader can be achieved.

The display control portion 705 located in the binding portion includes a light intensity comparison circuit 711, a CPU 712, an internal memory 713, an image signal generation circuit 714, a power supply circuit 715, signal transmission/reception portion 716, a power feeding portion 717, an operation portion 718, and a signal line driver circuits 714A to 714D, which are connected to each other via an interface or the like. Note that the signal transmission/reception portion 716 may be provided with an antenna portion 719 for transmitting/receiving data to/from an external device.

The light intensity comparison circuit 711 is a circuit which detects signals from the photo sensors 709A to 709D and compares the intensity of the signals which corresponds to the illuminance. The light intensity comparison circuit 711 encodes a signal corresponding to the obtained intensity of each photo sensor. Then, the light intensity comparison circuit 711 compares signals corresponding to illuminance between the photo sensor 709A and/or the photo sensor 709C included in the first display panel 701 and/or the third display panel 703 and the photo sensor 709B and/or the photo sensor 709D included in the second display panel 702 and/or the fourth display panel 704. The signal after the comparison is transmitted to the CPU 712, and the CPU 712 performs processing according to the signal. Note that the CPU 712 also performs processing according to the operation in the operation portion 718, or the like.

The signal transmission/reception portion 716 has a function of transferring, to the internal memory 713, data received by the antenna portion 719 or data stored in a recording medium. Data is stored in the internal memory 713 via the interface or the like. Note that the data transferred from the signal transmission/reception portion 716 to the internal memory 713 may be information stored such as user ID, as well as an image signal to be displayed on the display panel.

The internal memory 713 includes a memory portion which stores data transferred from the signal transmittance/reception portion 716 and/or a program for processing, in the CPU 712, a signal to be outputted to the image signal generation circuit 714 and/or the power supply circuit 715 on the basis of a signal from the light intensity comparison circuit 711, the power feeding portion 717, the operation portion 718, or the like. For example, the internal memory 713 includes a read only memory (ROM) or a random access memory (RAM).

The power feeding portion 717 has a function of performing wired or wireless power feeding or power feeding by a power storage unit such as a battery or a capacitor. The operation portion 718 has a function of encoding an operation by a user with a touch panel, an operation button with which a movable portion can be operated and transferring the encoded operation to the CPU 712.

The image signal generation circuit 714 is a circuit for, depending on the control of the CPU 712, supplying a clock signal, a start pulse, or the like for driving the scan line driver circuit to each of the scan line driver circuits 706A to 706D in order to perform display and non-display on the first display panel 701 to the fourth display panel 704 and supplying a clock signal, a start pulse, an image signal, or the like for driving the signal line driver circuit inside the binding portion to each of the signal line driver circuits 714A to 714D.

Note that the signal line driver circuits 714A to 714D each supply an image signal to the pixel circuit 710 in the pixel 708 through a signal line.

The power supply circuit 715 is a circuit for controlling power supply to a display element in accordance with control of the CPU 712 in order to perform display and non-display on the first display panel 701 to the fourth display panel 704. In FIG. 16, for description, a power supply circuit 715A which supplies electric power to the first display portion 707A, a power supply circuit 715B which supplies electric power to the second display portion 707B, a power supply circuit 715C which supplies electric power to the third display portion 707C, and a power supply circuit 715D which supplies electric power to the fourth display portion 707D are illustrated in the power supply circuit 715.

The performance of the e-book reader illustrated in FIG. 16 is described using one example. First, the light intensity comparison circuit 711 compares the illuminance on display surfaces of the display panels, which is obtained by the photo sensors 709A to 709D. The CPU 712 determines which display panel a user is looking at in accordance with the result of the comparison by the light intensity comparison circuit 711 or a signal from the operation portion 718. For example, the CPU 712 determines that the user is looking at the first display portion 707A and/or the third display portion 707C if the illuminance obtained by the photo sensor 709A and/or the photo sensor 709C is higher than the illuminance obtained by the photo sensor 709B and/or the photo sensor 709D according to the comparison. In accordance with the determination of which display panel the user is looking at, the image signal generation circuit 714 controls an image signal and a control signal which are to be supplied to the first display panel 701 to the fourth display panel 704 and/or the power supply circuit 715 controls power supply to the first display panel 701 to the fourth display panel 704. Specifically, power supply to the second display panel 702 and the fourth display panel 704 which are provided with the second display portion 707B and the fourth display portion 707D, respectively, at which the user is not looking is stopped, resulting in a reduction in power consumption and an increase in the life of the display panels.

As for the e-book reader illustrated in FIG. 16, a page at which a user is looking at is determined by the photo sensor and the light intensity comparison circuit, whereby supply of an image signal, electric power, and the like to the display panel can be switched as appropriate. Consequently, the e-book reader in which a reduction in power consumption and an increase in the life of the display panel are realized can be provided.

Embodiment 4 can be implemented by being combined with any of the structures described in the other embodiments as appropriate.

Embodiment 5

In Embodiment 5, an example of a display panel provided in an e-book reader will be described. A variety of display panels including any display element can be employed, and the display panel may be either a passive-matrix type or an active-matrix type.

As the display panel, an electronic paper, a light-emitting display panel (electroluminescence panel), a liquid crystal display panel, or the like can be used. The display panel is a panel in which a display element is sealed, and to which a connector such as a flexible printed circuit (FPC), a tape automated bonding (TAB) tape, or a tape carrier package (TCP) is attached and an external circuit including a signal line driver circuit is electrically connected. An IC including a signal line driver circuit may be mounted onto the display panel by a chip on glass (COG) method.

As the display panel, either a dual display panel in which display is performed on both sides or a single-side display panel in which display is performed on one side may be used.

In Embodiment 4, the third display panel 4313 is a dual display panel including the third display portion 4302 and the fourth display portion 4310. As the third display panel 4313, a dual-emission display panel may be used or two one-side-emission display panels attached may be used. Two liquid crystal display panels with a backlight (preferably a thin EL panel) therebetween may be used.

Figure 17A:
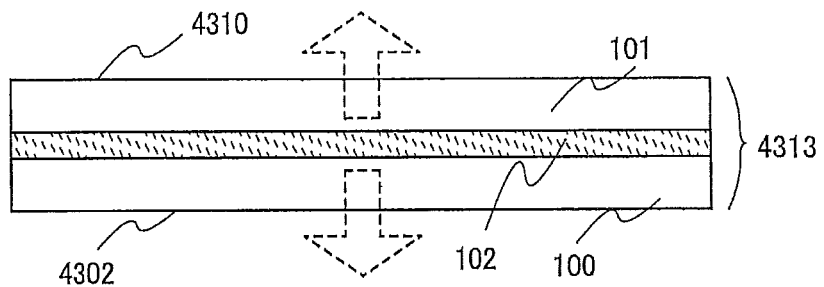
FIGS. 17A to 17C are views each illustrating one mode of a display panel.
Figure 17B:
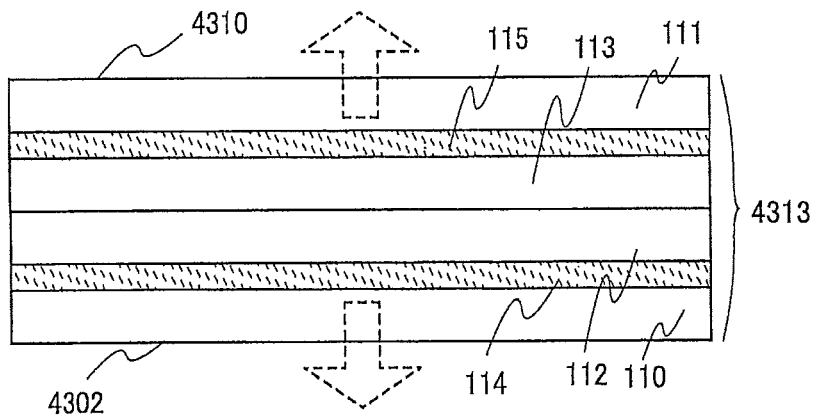
Figure 17C:
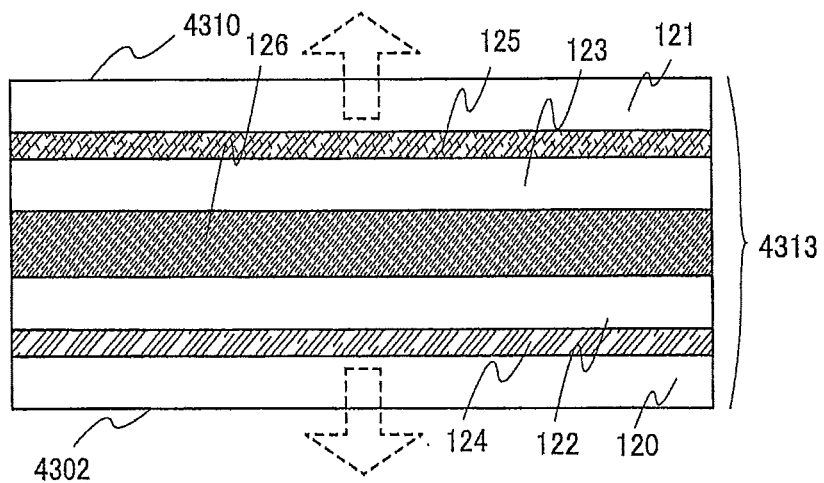

FIGS. 17A to 17C illustrate examples of the dual display panel using the third display panel 4313. Note that in FIGS. 17A to 17C, each arrow indicates a direction in which light emission is extracted.

FIG. 17A illustrates the third display panel 4313 in which a display element 102 is provided between a substrate 100 and a substrate 101, and the third display portion 4302 and the fourth display portion 4310 are provided on the substrate 100 side and the substrate 101 side, respectively. Display is performed on the first display portion 4302 and the fourth display portion 4310 by the display element 102; therefore, the substrates 100 and 101 have light-transmitting properties. It is preferable that an EL element that is a self-luminous light-emitting element be used as the display element 102. In the case of using light entering the third display panel 4313, a liquid crystal display element or an electrophoretic display element can be used as the display element 102.

FIG. 17B illustrates a third display panel 4313 in which a single-side display panel in which a display element 114 is provided between a substrate 110 and a substrate 112 and a single-side display panel in which a display element 115 is provided between a substrate 111 and a substrate 113 are stacked, and the third display portion 4302 and the fourth display portion 4310 are provided on the substrate 100 side and the substrate 101 side, respectively. Display is performed on the third display portion 4302 and the fourth display portion 4310 by the display element 114 and the display element 115, respectively; therefore, the substrates 110 and 111 have light-transmitting properties. To the contrary, the substrate 112 and the substrate 113 do not necessarily have light-transmitting properties but may have light-reflecting properties. The single-side display panels may be attached to each other by bonding the substrates 112 and 113 with a bonding layer. Either one of the substrate 112 and the substrate 113 may be provided.

It is preferable that EL elements be used as the display element 114 and the display element 115. In the case of using light entering the third display panel 4313, a liquid crystal display element or an electrophoretic display element can be used as each of the display element 114 and the display element 115. In order to enhance the light extraction efficiency, a reflective display panel is preferably used as the single-side display panel.

A backlight may be provided between light-transmissive liquid crystal display panels to form the third display panel 4313. FIG. 17C illustrates a third display panel 4313 in which a light-transmissive liquid crystal display panel in which a display element 124 is provided between a substrate 120 and a substrate 122 and a light-transmissive liquid crystal display panel in which a display element 125 is provided between a substrate 121 and a substrate 123 are stacked with a backlight 126 which functions as a light source provided therebetween, and the third display portion 4302 and the fourth display portion 4310 are provided on the substrate 120 side and the substrate 121 side, respectively. Display is performed on the third display portion 4302 by light from the backlight 126 and the display element 124 and display is performed on the fourth display portion 4310 by light from the backlight 126 and the display element 125; therefore, the substrates 120, 121, 122, and 123 have light-transmitting properties.

The backlight may be attached with a bonding layer. Either one of the substrate 122 and the substrate 123 may be provided. It is preferable that a thin EL panel be used as the backlight 126 because the thickness of the display panel 4313 can be reduced.

In the case of a single-side display panel, a non-light-transmissive or reflective housing is preferably provided for the side on which a display portion is not provided, in which case the display panel can be reinforced.

Modes of the display panel are described below with reference to FIGS. 18A and 18B, FIG. 19, and FIG. 20. FIGS. 18A and 18B, FIG. 19, and FIG. 20 correspond to cross-sectional views along line M-N in FIG. 4A. FIGS. 18A and 18B, FIG. 19, and FIG. 20 are examples of the case where the FPC 4324 is attached to the first display panel 4311 including the first display portion 4301 including a pixel circuit and the scan line driver circuit 4321a; the display portion 4301 and the scan line driver circuit 4321a provided over the element substrate 4331a are sealed with the sealing substrate 4332a by a sealant 4005.

As illustrated in FIGS. 18A and 18B, FIG. 19, and FIG. 20, the first display panel 4311 includes a connection terminal electrode 4015 and a terminal electrode 4016, and the connection terminal electrode 4015 and the terminal electrode 4016 are electrically connected to a terminal included in the FPC 4324 through an anisotropic conductive film 4019.

The connection terminal electrode 4015 is formed using the same conductive film as a first electrode layer 4030, and the terminal electrode 4016 is formed using the same conductive film as each of source and drain electrode layers included in thin film transistors 4010 and 4011.

Further, as illustrated in FIGS. 4A to 4C, the signal line driver circuit 4323 formed using a single crystal semiconductor film or a polycrystalline semiconductor film over a separately prepared substrate is mounted by an FPC so as to be provided in the supporting portion 4308. A variety of signals and potentials are supplied from the FPC 4324 to the signal line driver circuit 4323, the scan line driver circuit 4321a, and the display portion 4301.

Note that there is no particular limitation on the connection method of the signal line driver circuit 4323: a COG method, a wire bonding method, a TAB method, or the like can be used.

The first display portion 4301 and the scan line driver circuit 4321a which are provided over the element substrate 4331a each include a plurality of thin film transistors. In FIGS. 18A and 18B, FIG. 19, and FIG. 20, the thin film transistor 4010 included in the first display portion 4301 and the thin film transistor 4011 included in the scan line driver circuit 4321a are illustrated. Over the thin film transistors 4010 and 4011, insulating layers 4020 and 4021 are provided. An insulating film 4023 is an insulating film serving as a base film.

A variety of thin film transistors can be applied to the thin film transistors 4010 and 4011 without particular limitation. FIGS. 18A and 18B, FIG. 19, and FIG. 20 each illustrate an example in which inverted-staggered thin film transistors having a bottom-gate structure are used as the thin film transistors 4010 and 4011. Although the thin film transistors 4010 and 4011 are channel-etched thin film transistors in the drawings, a channel-protective inverted-staggered thin film transistor in which a channel protective film is provided over a semiconductor layer may be used.

The thin film transistor 4010 included in the first display portion 4301 is electrically connected to a display element to form a display panel. A variety of display elements can be used as the display element as long as display can be performed.

As a display panel, an electronic paper can be used. As for image writing methods of the electronic paper, there are many types depending on a change of shape or position, a physical change, and the like of a display medium by an electric field, a magnetic field, light, heat, and the like. For example, there are a twist ball-type, an electrophoresis type, a powder system type (also called a toner display), a liquid crystal type, and the like.

Figure 22:
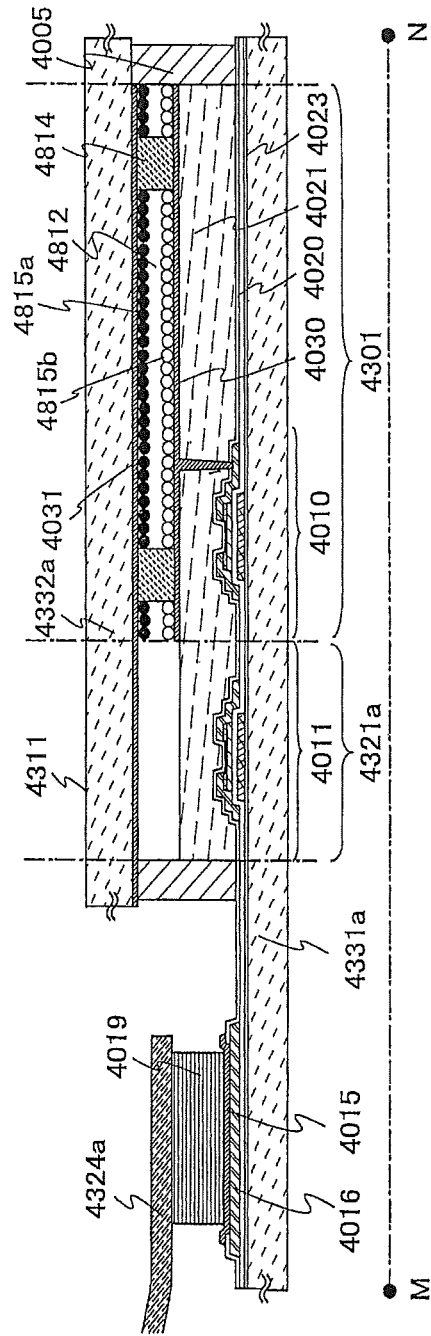
FIG. 22 is a view illustrating one mode of a display panel.

FIGS. 18A and 18B and FIG. 22 illustrate examples of the case where an active-matrix electronic paper is used as the first display panel 4311. An electronic papers have advantages such as readability which is as high as that of paper media, low power consumption compared to other display panels, and thin light form.

FIGS. 18A and 18B and FIG. 22 illustrate active-matrix electronic papers as examples of the display panel.

The electronic paper in FIG. 18A is an example of a display device using a twist ball display method. The twist ball display method refers to a method in which spherical particles each colored in black and white are arranged between electrode layers included in a display element, and a potential difference is generated between the electrode layers to control the orientation of the spherical particles, so that display is performed.

Between the first electrode layer 4030 connected to the thin film transistor 4010 and a second electrode layer 4031 provided for the sealing substrate 4332a, spherical particles 4613 each of which includes a black region 4615a, a white region 4615b, and a cavity 4612 which is filled with liquid around the black region 4615a and the white region 4615b, are provided. A space around the spherical particles 4613 is filled with a filler 4614 such as a resin. The second electrode layer 4031 corresponds to a common electrode (counter electrode). The second electrode layer 4031 is electrically connected to a common potential line.

Instead of the twist ball, an electrophoretic element can be used. An example of the case where an electrophoretic element is used as a display element is illustrated in FIG. 18B.

Microcapsules 4713 each having a diameter of about 10 µm to 200 µm, in which transparent liquid 4712, negatively charged black microparticles 4715a as first particles, and positively charged white microparticles 4715b as second particles are encapsulated, are used.

In the microcapsules 4713 provided between the first electrode layer 4030 and the second electrode layer 4031, when an electric field is applied by the first electrode layer 4030 and the second electrode layer 4031, the white microparticles 4715b and the black microparticles 4715a move to opposite directions to each other, so that white or black can be displayed. A display element using this principle is an electrophoretic display element. The electrophoretic display element has high reflectivity, and thus, an auxiliary light is not needed, power consumption is low, and a display portion can be recognized in a dim place. In addition, even when power is not supplied to the display portion, an image which has been displayed once can be maintained. Accordingly, a displayed image can be stored even when the display panel is distanced from an electric wave source.

Note that the first particle and the second particle each contain pigment and do not move without an electric field. Moreover, the colors of the first particle and the second particle are different from each other (the particles may be colorless).

A solution in which the above microcapsules are dispersed in a solvent is referred to as electronic ink. This electronic ink can be printed on a surface of glass, plastic, cloth, paper, or the like. Further, the use of a color filter or particles that have a pigment makes it possible to perform color display.

Note that the first particles and the second particles in the microcapsules may be formed using a single material selected from a conductive material, an insulating material, a semiconductor material, a magnetic material, a liquid crystal material, a ferroelectric material, an electroluminescent material, an electrochromic material, and a magnetophoretic material, or a composite material of any of these.

Electronic Liquid Powder (registered trademark) can be used for an electronic paper using liquid powders. An example of the case where an electronic liquid powder is used as the display element is illustrated in FIG. 22. Positively charged black liquid powders 4815a and negatively charged white liquid powders 4815b are contained in a space 4812 segmented by the first electrode layer 4030, the second electrode layer 4031, and a rib 4814. The space 4812 is filled with air.

When an electric field is applied by the first electrode layer 4030 and the second electrode layer 4031, the black liquid powders 4815a and the white liquid powders 4815b move in opposite directions to display white or black. As the liquid powders, color powders of red, yellow, and/or blue may be used.

A light-emitting element using electroluminescence (an EL element) may be used as the display element. Light-emitting elements using electroluminescence are classified according to whether a light-emitting material is an organic compound or an inorganic compound; in general, the former is called an organic EL element, and the latter is called an inorganic EL element.

In an organic EL element, by application of voltage to a light-emitting element, electrons and holes are separately injected from a pair of electrodes into a layer containing a light-emitting organic compound, and thus current flows. The carriers (electrons and holes) are recombined, and thus the light-emitting organic compound is excited. When the light-emitting organic compound returns to a ground state from the excited state, light is emitted. Owing to such a mechanism, this light-emitting element is called a current-excitation light-emitting element.

Inorganic EL elements are classified according to their element structures into a dispersion-type inorganic EL element and a thin-film inorganic EL element. A dispersion-type inorganic EL element includes a light-emitting layer in which particles of a light-emitting material are dispersed in a binder, and its light emission mechanism is donor-acceptor recombination type light emission that uses a donor level and an acceptor level. A thin-film inorganic EL element has a structure where a light-emitting layer is sandwiched between dielectric layers, which are further sandwiched between electrodes, and its light emission mechanism is localized type light emission that uses inner-shell electron transition of metal ions. Description is made here using an organic EL element as a light-emitting element.

In order to extract light emitted from the light-emitting element, at least one of an anode and a cathode may be transparent. A light-emitting element can have a top emission structure in which light is extracted through the surface opposite to the substrate; a bottom emission structure in which light is extracted through the surface on the substrate side; or a dual emission structure in which light is extracted through the surface opposite to the substrate and the surface on the substrate side.

Figure 19:
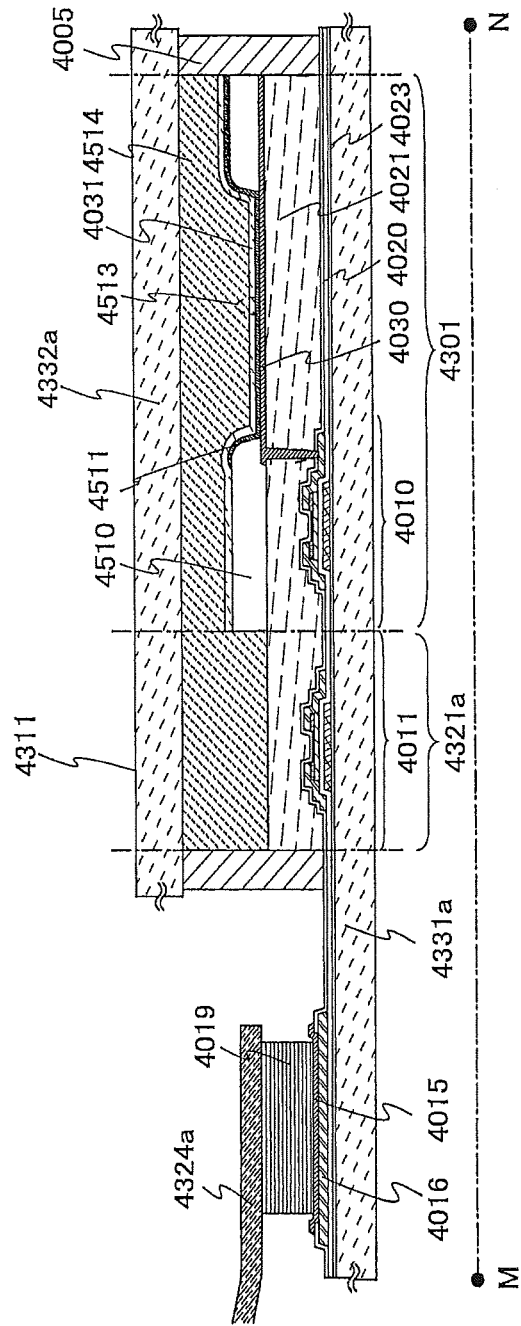
FIG. 19 is a view illustrating one mode of a display panel.

An example of the case where a light-emitting display panel (EL panel) is used as the first display panel 4311 is illustrated in FIG. 19. A light-emitting element 4513 which is a display element is electrically connected to the thin film transistor 4010 provided in the display portion 4301. A structure of the light-emitting element 4513 is not limited to the stacked-layer structure including the first electrode layer 4030, an electroluminescent layer 4511, and the second electrode layer 4031, which is illustrated in FIG. 19. The structure of the light-emitting element 4513 can be changed as appropriate depending on a direction in which light is extracted from the light-emitting element 4513, or the like.

A partition wall 4510 is formed using an organic resin film, an inorganic insulating film, or organic polysiloxane. It is particularly preferable that the partition wall 4510 be formed using a photosensitive material to have an opening portion over the first electrode layer 4030 so that a sidewall of the opening portion is formed as a tilted surface with continuous curvature.

The electroluminescent layer 4511 may be formed using a single layer or a plurality of layers stacked.

A protective film may be formed over the second electrode layer 4031 and the partition wall 4510 in order to prevent entry of oxygen, hydrogen, moisture, carbon dioxide, or the like into the light-emitting element 4513. As the protective film, a silicon nitride film, a silicon nitride oxide film, a DLC film, or the like can be formed. A filler 4514 is provided in a space sealed with the element substrate 4331a, the sealing substrate 4332a, and the sealant 4005 so as to seal closely. It is preferable that a panel be packaged (sealed) with a protective film (such as a laminate film or an ultraviolet curable resin film) or a cover material with high air-tightness and little degasification so that the panel is not exposed to the outside air, in this manner.

As the filler 4514, an ultraviolet curable resin or a thermosetting resin can be used as well as an inert gas such as nitrogen or argon. For example, polyvinyl chloride (PVC), acrylic, polyimide, an epoxy resin, a silicone resin, polyvinyl butyral (PVB), or ethylene vinyl acetate (EVA) can be used. For example, nitrogen is used for the filler.

In addition, if needed, an optical film such as a polarizing plate, a circularly polarizing plate (including an elliptically polarizing plate), a retardation plate (a quarter-wave plate or a half-wave plate), or a color filter may be provided as appropriate on a light-emitting surface of the light-emitting element. Further, the polarizing plate or the circularly polarizing plate may be provided with an anti-reflection film. For example, anti-glare treatment by which reflected light is diffused by roughness on the surface so as to reduce the glare can be performed.

Figure 20:
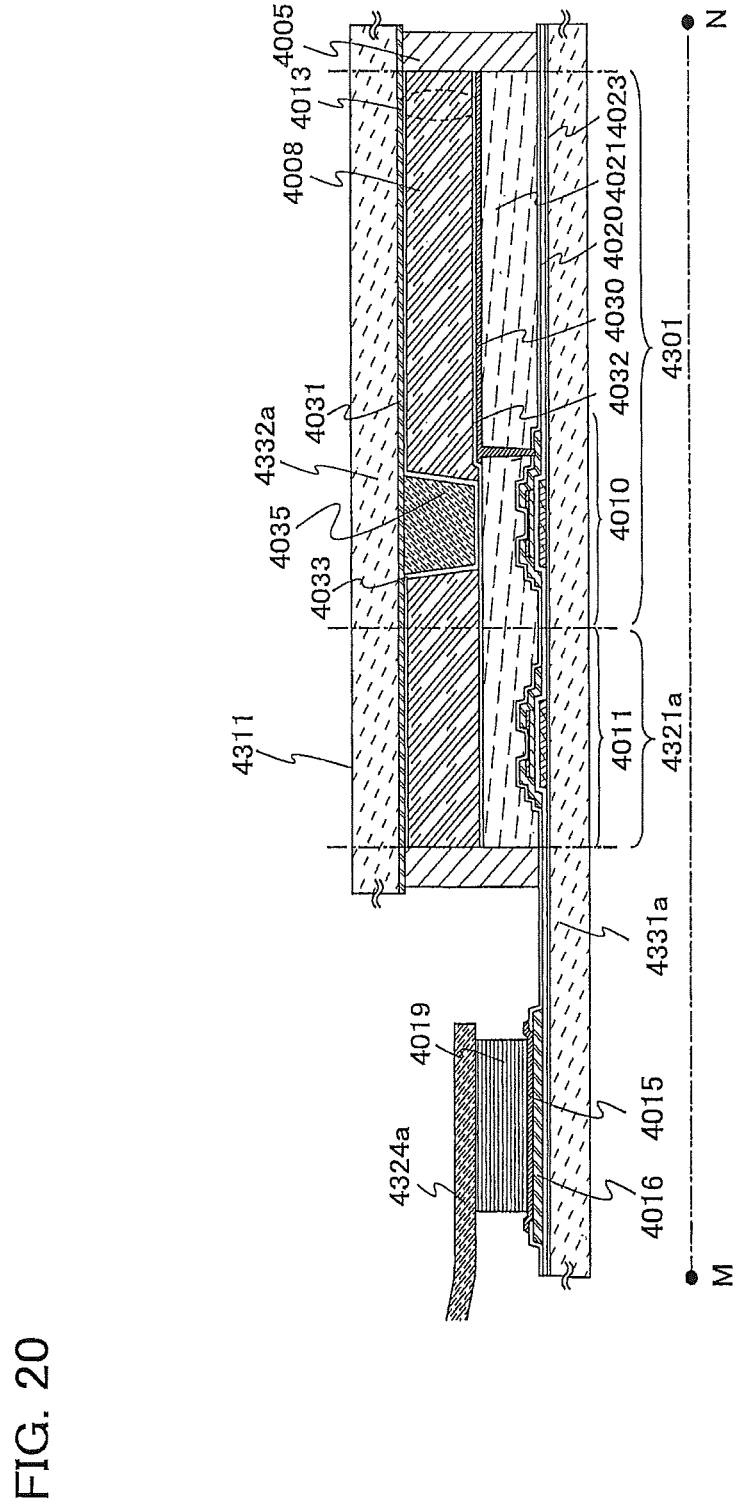
FIG. 20 is a view illustrating one mode of a display panel.
Figure 21A:
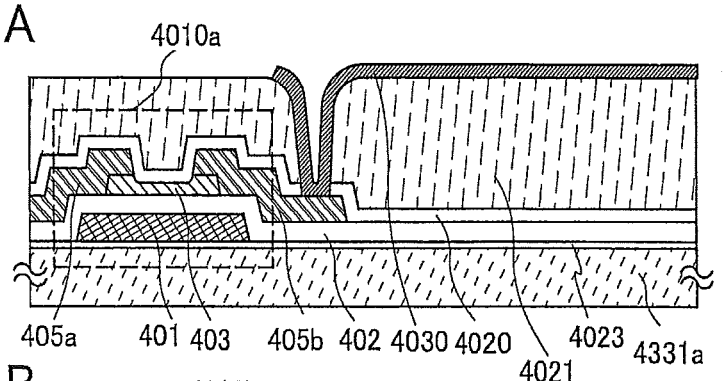
FIGS. 21A to 21D are views each illustrating one mode of a transistor that is applicable to an e-book reader.
Figure 21B:
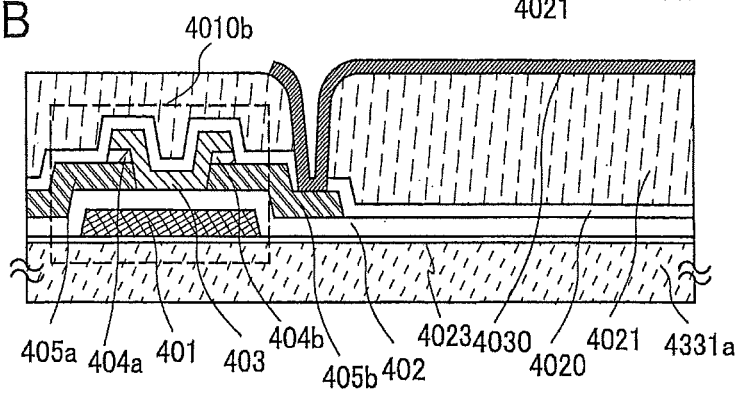
Figure 21C:
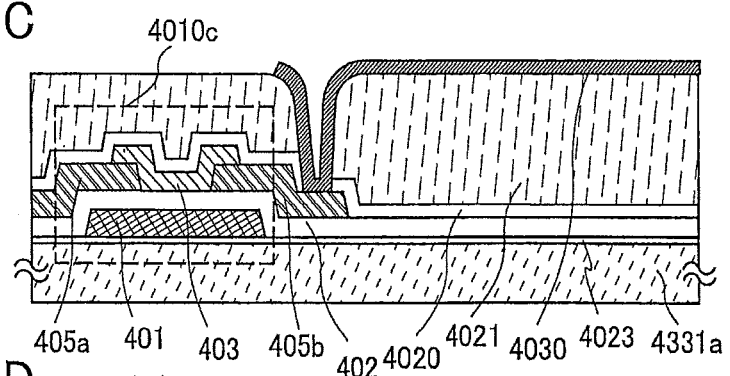
Figure 21D:
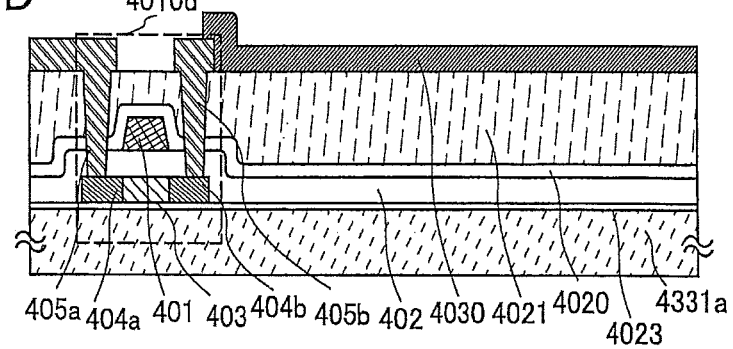

An example of the case where a liquid crystal display panel is used as the first display panel 4311 is illustrated in FIG. 20. In FIG. 20, a liquid crystal element 4013 which is a display element includes the first electrode layer 4030, the second electrode layer 4031, and a liquid crystal layer 4008. Insulating films 4032 and 4033 serving as orientation films are provided to hold the liquid crystal layer 4008 therebetween. The second electrode layer 4031 is provided on the sealing substrate 4332a side, and the first electrode layer 4030 and the second electrode layer 4031 are stacked with the liquid crystal layer 4008 provided therebetween.

Reference numeral 4035 indicates a columnar spacer formed by selectively etching the insulating film. The columnar spacer 4035 is provided in order to control the thickness of the liquid crystal layer 4008 (a cell gap). A spherical spacer may also be used.

Although not shown in the liquid crystal display device in FIG. 20, a color filter (a coloring layer), a black matrix (a light-shielding layer), an optical member (an optical substrate) such as a polarizing member, a retardation member, or an anti-reflection member, and the like are provided as appropriate. For example, circular polarization by using a polarizing substrate and a retardation substrate may be used. A backlight, a side light, or the like may be used as a light source; as the backlight, it is preferable to use an EL panel in the point of small thickness.

Alternatively, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase is generated within an only narrow range of temperature, liquid crystal composition containing a chiral agent at 5 wt % or more so as to improve the temperature range is used for the liquid crystal layer 4008. Since the liquid crystal composition including a blue phase liquid crystal and a chiral agent has a response time as short as 10 μs to 100 μs and is optically isotropic, orientation treatment is not necessary and viewing angle dependence is small.

Although FIG. 20 illustrates an example of a light-transmissive liquid crystal display panel, the present invention can also be applied to a reflective liquid crystal display panel or a light-semi-transmissive liquid crystal display panel.

In FIGS. 18A and 18B, FIG. 19, FIG. 20, and FIG. 22, a plastic having light-transmitting properties can be used as each of the element substrate 4331 and the sealing substrate 4332. As the plastic, a fiberglass-reinforced plastics (FRP) plate, a polyvinyl fluoride (PVF) film, a polyester film, or an acrylic resin film can be used. A sheet with a structure in which an aluminum foil is sandwiched between PVF films or polyester films can be used.

The insulating layer 4020 serves as a protective film of a thin film transistor.

Note that the protective film is provided to prevent entry of contaminant impurities such as organic substance, metal, or moisture existing in air and is preferably a dense film. The protective film may be formed with a single layer or a stacked layer of a silicon oxide film, a silicon nitride film, a silicon oxynitride film, a silicon nitride oxide film, an aluminum oxide film, an aluminum nitride film, aluminum oxynitride film, and/or an aluminum nitride oxide film by a sputtering method.

Further, the insulating layer 4021 serving as a planarization insulating film is formed as the planarizing insulating film. The insulating layer 4021 can be formed from an organic material having heat resistance, such as polyimide, acrylic, benzocyclobutene, polyamide, or epoxy. Other than such organic materials, it is also possible to use a low-dielectric constant material (a low-k material), a siloxane-based resin, phosphosilicate glass (PSG), borophosphosilicate glass (BPSG), or the like. The insulating layer may be formed by stacking a plurality of insulating films formed of these materials.

There is no particular limitation on the method of forming the insulating layers 4020 and 4021. Any of the following methods can be used depending on the material of the insulating layer 4021: a sputtering method, an SOG method, spin coating, dip coating, spray coating, a droplet discharge method (e.g., an inkjet method, screen printing, or offset printing), a doctor knife, a roll coater, a curtain coater, a knife coater, or the like. In the case where the insulating layer is formed using a material solution, the semiconductor layer may be annealed (at 200° C. to 400° C.) at the same time as a baking step. When the step of baking the insulating layers and the step of annealing the semiconductor layer are performed at the same time, a display panel can be manufactured efficiently.

The display panel displays an image by transmitting light from a light source or a display element. Therefore, the substrates and the thin films such as insulating films and conductive films provided for the display portion where light is transmitted have light-transmitting properties with respect to light in the visible-light wavelength range.

The first electrode layer 4030 and the second electrode layer 4031 (each of which may be called a pixel electrode layer, a common electrode layer, a counter electrode layer, or the like) for applying voltage to the display element may have light-transmitting properties or light-reflecting properties, depending on the direction in which light is extracted, the position where the electrode layer is provided, the pattern structure of the electrode layer, and the like.

The first electrode layer 4030 and the second electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added.

The first electrode layer 4030 and the second electrode layer 4031 each can be formed using one kind or plural kinds selected from metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof.

A conductive composition containing a conductive high molecule (also referred to as a conductive polymer) can be used for the first electrode layer 4030 and the second electrode layer 4031. As the conductive high molecule, a so-called π-electron conjugated conductive polymer can be used. For example, polyaniline or a derivative thereof, polypyrrole or a derivative thereof, polythiophene or a derivative thereof, a copolymer of two or more kinds of them, and the like can be given.

Since the thin film transistor is easily broken due to static electricity or the like, a protective circuit for protecting the driver circuit is preferably provided over the same substrate for a gate line or a source line. The protective circuit is preferably formed using a nonlinear element.

Embodiment 5 can be implemented by being combined with any of the structures described in the other embodiments as appropriate.

Embodiment 6

In Embodiment 6, examples of a material used forming an e-book reader and an element structure will be specifically described.

Since a signal line driver circuit is provided in a binding portion, it does not particularly need to have flexibility. Accordingly, a semiconductor integrated circuit chip (IC) which is capable of high-speed operation and in which a semiconductor substrate (a semiconductor wafer) is used is preferably used as the signal line driver circuit. As the semiconductor substrate, a single crystal semiconductor substrate or a polycrystalline semiconductor substrate can be used, and a semiconductor wafer such as a silicon wafer or a germanium wafer or a compound semiconductor wafer of gallium arsenide, indium phosphide, or the like is used.

Alternatively, a substrate (an SOI substrate) having an SOI structure in which a single crystal semiconductor layer is provided on an insulating surface may be used for the signal line driver circuit. The SOI substrate can be formed by a separation by implanted oxygen (SIMOX) method or a Smart-Cut (registered trademark) method. In the SIMOX method, after oxygen ions are implanted into a single crystal silicon substrate to form an oxygen containing layer containing oxygen at a given depth, heat treatment is performed to form an embedded insulating layer at a given depth from the surface of the single crystal silicon substrate, and a single crystal silicon layer is formed on the embedded insulating layer. In the Smart-Cut (registered trademark) method, hydrogen ions are implanted into an oxidized single crystal silicon substrate to form a hydrogen-containing layer in a portion at a depth corresponding to a desired depth, the oxidized single crystal silicon substrate is attached to another semiconductor substrate (such as a single crystalline silicon substrate having a silicon oxide film for attachment on its surface), and heat treatment is performed to separate the single crystal silicon substrate at the hydrogen-containing layer, and stacked layers of the silicon oxide film and the single crystalline silicon layer is formed on the semiconductor substrate.

As a semiconductor element provided in a circuit portion of the e-book reader, not to mention a field-effect transistor, a memory element which uses a semiconductor layer can be employed; accordingly, a semiconductor integrated circuit having functions required for various applications can be provided.

There is no particular limitation on the method by which a scan line driver circuit and a display portion are provided as long as the scan line driver circuit and the display portion are provided over a flexible substrate. The scan line driver circuit and the display portion may be formed directly on a flexible substrate. Alternatively, the scan line driver circuit and the display portion may be first formed on another formation substrate, and then only an element layer may be transferred from the formation substrate to a flexible substrate by a separation method. For example, the scan line driver circuit and the display portion can be formed on a formation substrate in the same step and transferred to a flexible substrate of a display panel. In that case, since the scan line driver circuit and the display portion are formed in the same step, they are preferably formed with transistors having the same structure and material, in which case a reduction in cost can be realized. Consequently, channel layers of transistors included in the scan line driver circuit and the display portion are formed using the same material.

Alternatively, after transfer from a formation substrate to a flexible substrate, attachment of components over the flexible substrate to a substrate of a display panel may be performed. For example, a plurality of scan line driver circuits are formed over a formation substrate and transferred to a flexible supporting substrate, and then the plurality of scan line driver circuits are separated into individual scan line driver circuits with the flexible supporting substrate divided, and the scan line driver circuit provided over the flexible supporting substrate may be attached as many as needed to one display panel. In that case, since the scan line driver circuit and the display portion are formed in different steps, transistors having different structures and materials can be used.

The above transfer method and direct formation method may be combined. For example, a wiring for electrically connecting a display portion, a scan line driver circuit, an FPC, and the like may be directly formed on a flexible substrate of a display panel by a printing method or the like.

The formation substrate may be selected as appropriate depending on the formation process of the element layer. For example, a glass substrate, a quartz substrate, a sapphire substrate, a ceramic substrate, or a metal substrate having an insulating layer on its surface can be used as the formation substrate. Alternatively, a plastic substrate having heat resistance to the processing temperature may be used.

For the flexible substrate, an aramid resin, a polyethylene naphthalate (PEN) resin, a polyether sulfone (PES) resin, a polyphenylene sulfide (PPS) resin, a polyimide (PI) resin, or the like can be used. Alternatively, a prepreg that is a structure body in which fiber is impregnated with an organic resin may be used.

There is no particular limitation on the method of transferring the element layer from the formation substrate to another substrate, and a variety of methods can be used. For example, a separation layer may be formed between the formation substrate and the element substrate.

Note that the element layer in this specification includes not only a semiconductor element layer provided on the element substrate side but also a counter electrode layer or the like provided on the counter substrate side. Accordingly, the separation step can be used for both the element substrate and sealing substrate sides. Further, in view of the simplicity of the manufacturing process, after the element layer is transferred from the formation substrate to the flexible substrate, the manufacturing process can be performed with the flexible substrate temporally attached to a glass substrate or the like.

The separation layer is formed to have a single-layer structure or a stacked-layer structure including a layer formed of an element such as tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), or silicon (Si); or an alloy material or a compound material containing any of the elements as its main component by a sputtering method, a plasma CVD method, a coating method, a printing method, or the like. A crystalline structure of a layer containing silicon may be any one of an amorphous structure, a microcrystalline structure, and a polycrystalline structure. Note that a coating method includes a spin-coating method, a droplet discharge method, and a dispensing method in its category here.

In the case where the separation layer has a single-layer structure, it is preferable to form a tungsten layer, a molybdenum layer, or a layer containing a mixture of tungsten and molybdenum. Alternatively, a layer containing oxide or oxynitride of tungsten, a layer containing oxide or oxynitride of molybdenum, or a layer containing oxide or oxynitride of a mixture of tungsten and molybdenum is formed. Note that the mixture of tungsten and molybdenum, for example, corresponds to an alloy of tungsten and molybdenum.

In the case where the separation layer has a stacked-layer structure, it is preferable to form, as a first layer, a tungsten layer, a molybdenum layer, or a layer containing a mixture of tungsten and molybdenum, and form, as a second layer, oxide, nitride, oxynitride, or nitride oxide of tungsten, molybdenum, or a mixture of tungsten and molybdenum.

In the case where the separation layer is formed to have a stacked-layer structure including a layer containing tungsten and a layer containing oxide of tungsten, the stacked-later structure may be formed by utilization of the following: a layer containing tungsten is formed first and an insulating layer formed of oxide is formed thereover to form a layer containing oxide of tungsten at the interface between the tungsten layer and the insulating layer. Furthermore, the surface of the layer containing tungsten may be subjected to thermal oxidation treatment, oxygen plasma treatment, or treatment using a strong oxidizing solution such as ozone water to form a layer containing oxide of tungsten. Plasma treatment or heat treatment may be performed in an atmosphere of oxygen, nitrogen, or dinitrogen monoxide alone, or a mixed gas of the above gas and another gas. The same applies to the case of forming a layer containing nitride, oxynitride, or nitride oxide of tungsten. After the layer containing tungsten is formed, a silicon nitride layer, a silicon oxynitride layer, or a silicon nitride oxide layer may be formed thereover.

Note that for the step of transferring the element layer to another substrate, any of the following methods can be used as appropriate: a method in which a separation layer is formed between a substrate and an element layer, a metal oxide film is provided between the separation layer and the element layer, and the metal oxide film is embrittled by crystallization, thereby separating the element layer; a method in which an amorphous silicon film containing hydrogen is provided between a substrate having high heat resistance and an element layer, and the amorphous silicon film is removed by laser light irradiation or etching, thereby separating the element layer; a method in which a separation layer is formed between a substrate and an element layer, a metal oxide film is provided between the separation layer and the element layer, the metal oxide film is embrittled by crystallization, part of the separation layer is removed by etching using a solution or a fluoride halogen gas such as $NF_3$, $BrF_3$, or $ClF_3$, and then the element layer is separated at the embrittled metal oxide film; a method in which a substrate over which an element layer is formed is mechanically removed or is removed by etching using a solution or a fluoride halogen gas such as $NF_3$, $BrF_3$, or $ClF_3$; and the like. Alternatively, a method may be used in which a film containing nitrogen, oxygen, hydrogen, or the like (e.g., an amorphous silicon film containing hydrogen, an alloy film containing hydrogen, or an alloy film containing oxygen) is used as a separation layer, and the separation layer is irradiated with laser light to release nitrogen, oxygen, or hydrogen contained in the separation layer as a gas, thereby promoting separation between the element layer and the substrate.

Combination of any of the above separation methods makes it easier to perform the transferring step. In other words, separation can also be performed with physical force (e.g., by a machine or the like) after making it easier for the separation layer and the element formation layer to be separated by laser light irradiation, etching of the separation layer with a gas, a solution, or the like, or mechanical removal of the separation layer with a sharp knife, scalpel, or the like.

Alternatively, the interface between the separation layer and the element layer may be soaked with a liquid to separate the element layer from the substrate. Water or the like can be used as the liquid.

There is no particular limitation on the kind of transistor included in the e-book reader disclosed in this specification. Accordingly, a variety of structures and semiconductor materials can be used for the transistor.

Examples of a structure of a thin film transistor is described with reference to FIGS. 21A to 21D. FIGS. 21A to 21D illustrates examples of the thin film transistor which can be applied to the thin film transistor 4010 in Embodiment 5.

In FIGS. 21A to 21D, the insulating film 4023 is formed over the element substrate 4331*a*, and thin film transistors 4010*a*, 4010*b*, 4010*c*, and 4010*d* are provided over the insulating film 4023. The insulating layers 4020 and 4021 are formed over each of the thin film transistors 4010*a*, 4010*b*, 4010*c*, and 4010*d*, and the first electrode layer 4030 is provided to be electrically connected to the thin film transistors 4010*a*, 4010*b*, 4010*c*, and 4010*d*.

The thin film transistor 4010*a* has another structure of the thin film transistor 4010 illustrated in FIGS. 18A and 18B, FIG. 19, and FIG. 20, in which wiring layers 405*a* and 405*b* serving as source and drain electrode layers are in contact with a semiconductor layer 403 without n$^+$ layers interposed therebetween.

The thin film transistor 4010*a* is an inverted-staggered thin film transistor in which a gate electrode layer 401, a gate insulating layer 402, the semiconductor layer 403, and the wiring layers 405*a* and 405*b* serving as source and drain electrode layers are provided over the element substrate 4331*a* having an insulating surface and the insulating film 4023. The n$^+$ layers 404*a* and 404*b* are semiconductor layers having lower resistance than the semiconductor layer 403.

The thin film transistor 4010*b* is a bottom-gate thin film transistor in which the gate electrode layer 401, the gate insulating layer 402, the wiring layers 405*a* and 405*b* serving as source and drain electrode layers, n$^+$ layers 404*a* and 404*b* serving as source and drain regions, and the semiconductor layer 403 are provided over the element substrate 4331*a* having an insulating surface and the insulating film 4023. In addition, the insulating layer 4020 is provided in contact with the semiconductor layer 403 so as to cover the thin film transistor 4010*b*.

Note that the n$^+$ layers 404*a* and 404*b* may be provided between the gate insulating layer 402 and the wiring layers 405*a* and 405*b*. Alternatively, the n$^+$ layers may be provided both between the gate insulating layer and the wiring layers and between the wiring layers and the semiconductor layer.

The gate insulating layer 402 exists in the entire region including the thin film transistor 4010*b*, and the gate electrode layer 401 is provided between the gate insulating layer 402 and the element substrate 4331*a* having an insulating surface. The wiring layers 405*a* and 405*b* and the n$^+$ layers 404*a* and 404*b* are provided over the gate insulating layer 402. In addition, the semiconductor layer 403 is provided over the gate insulating layer 402, the wiring layers 405*a* and 405*b*, and the n+ layers 404a and 404b. Although not illustrated, a wiring layer is provided over the gate insulating layer 402 in addition to the wiring layers 405a and 405b, and the wiring layer extends beyond the perimeter of the semiconductor layer 403.

The thin film transistor 4010c has another structure of the thin film transistor 4010b, in which source and drain electrode layers are in contact with a semiconductor layer without n+ layers interposed therebetween.

The gate insulating layer 402 exists in the entire region including the thin film transistor 4010c, and the gate electrode layer 401 is provided between the gate insulating layer 402 and the element substrate 4331a having an insulating surface. The wiring layers 405a and 405b are provided over the gate insulating layer 402. In addition, the semiconductor layer 403 is provided over the gate insulating layer 402 and the wiring layers 405a and 405b. Although not illustrated, a wiring layer is provided over the gate insulating layer 402 in addition to the wiring layers 405a and 405b, and the wiring layer extends beyond the perimeter of the semiconductor layer 403.

The thin film transistor 4010d is a top-gate thin film transistor and an example of a planar thin film transistor. The semiconductor layer 403 including the n+ layers 404a and 404b serving as source and drain regions is formed over the element substrate 4331a having an insulating surface and the insulating film 4023. The gate insulating layer 402 is formed over the semiconductor layer 403, and the gate electrode layer 401 is formed over the gate insulating layer 402. In addition, the wiring layers 405a and 405b serving as source and drain electrode layers are formed in contact with the n+layers 404a and 404b. The n+ layers 404a and 404b are semiconductor layers having lower resistance than the semiconductor layer 403.

The thin film transistor may be a top-gate forward-staggered thin film transistor.

Although a single-gate transistor is described in this embodiment, a multi-gate transistor such as a double-gate transistor may be used. In that case, a gate electrode layer may be provided above and below the semiconductor layer, or a plurality of gate electrode layers may be provided only on one side of (above or below) the semiconductor layer.

There is no particular limitation on the semiconductor material used for the semiconductor layer. Examples of the material used for the semiconductor layer of the thin film transistor are described below.

As a material for the semiconductor layer included in the semiconductor element, it is possible to use an amorphous semiconductor (hereinafter, also referred to as "AS") that is formed by a sputtering method or a vapor-phase growth method using a semiconductor material gas typified by silane or germane, a polycrystalline semiconductor that is obtained by crystallizing the amorphous semiconductor by utilizing light energy or thermal energy, a microcrystalline semiconductor (also referred to as a semi-amorphous or microcrystal semiconductor, and hereinafter, also referred to as "SAS"), or the like. The semiconductor layer can be deposited by a sputtering method, an LPCVD method, a plasma CVD method, or the like.

Considering Gibbs free energy, the microcrystalline semiconductor film is in a metastable state intermediate between an amorphous state and a single crystal state. In other words, the microcrystalline semiconductor is in a third state that is stable in free energy and has short-range order and lattice distortion. Columnar-like or needle-like crystals grow in the normal direction to the surface of the substrate. The Raman spectrum of microcrystalline silicon, which is a typical example of a microcrystalline semiconductor, is located in lower wave numbers than 520 $cm^{-1}$ that represents the peak of the Raman spectrum of single crystal silicon. In other words, the peak of the Raman spectrum of the microcrystalline silicon exists between 520 $cm^{-1}$ that represents that of single crystal silicon and 480 $cm^{-1}$ that represents that of amorphous silicon. In addition, the microcrystalline silicon contains hydrogen or halogen of at least 1 atomic % or more in order to terminate a dangling bond. Moreover, the microcrystalline silicon contains a rare gas element such as helium, argon, krypton, or neon to further promote lattice distortion, whereby a favorable microcrystalline semiconductor film with improved stability can be obtained.

This microcrystalline semiconductor film can be formed by a high-frequency plasma CVD method with a frequency of several tens of megahertz to several hundreds of megahertz, or a microwave plasma CVD apparatus with a frequency of 1 GHz or more. Typically, the microcrystalline semiconductor film can be formed with silicon hydride such as $SiH_4$, $Si_2H_6$, $SiH_2Cl_2$, or $SiHCl_3$, or $SiCl_4$ or $SiF_4$, and hydrogen which is for dilution. Alternatively, the microcrystalline semiconductor film can be formed with, in addition to silicon hydride and hydrogen, one or more kinds of rare gas elements selected from helium, argon, krypton, and neon for dilution. In such a case, the flow rate ratio of hydrogen to silicon hydride is set to 5:1 to 200:1, preferably, 50:1 to 150:1, and more preferably, 100:1.

Hydrogenated amorphous silicon is given as a typical example of an amorphous semiconductor, and polysilicon and the like is given as a typical example of a crystalline semiconductor. Polysilicon (polycrystalline silicon) includes so-called high-temperature polysilicon that contains, as its main component, polysilicon formed at a process temperature of 800° C. or higher, so-called low-temperature polysilicon that contains, as its main component, polysilicon formed at a process temperature of 600° C. or lower, and polysilicon formed by crystallizing amorphous silicon by using an element which promotes crystallization, or the like. Needless to say, a microcrystalline semiconductor or a semiconductor partially including a crystalline phase can also be used as described above.

As the semiconductor material, a compound semiconductor such as GaAs, InP, SiC, ZnSe, GaN, or SiGe can be used as well as silicon (Si) or germanium (Ge) alone.

In the case of using a crystalline semiconductor film for the semiconductor layer, the crystalline semiconductor film may be formed by any of a variety of methods (e.g., laser crystallization, thermal crystallization, or thermal crystallization using an element such as nickel which promotes crystallization). Further, when a microcrystalline semiconductor that is SAS is crystallized by laser light irradiation, crystallinity thereof can be enhanced. In the case where an element which promotes crystallization is not introduced, before being irradiated with laser light, an amorphous silicon film is heated at 500° C. for one hour in a nitrogen atmosphere, whereby hydrogen contained in the amorphous silicon film is released to a concentration of $1 \times 10^{20}$ atoms/$cm^3$ or less. This is because, if the amorphous silicon film contains a large amount of hydrogen, the amorphous silicon film would be destroyed by laser light irradiation.

There is no particular limitation on the method of introducing a metal element into the amorphous semiconductor film as long as the metal element can exist on the surface of or inside the amorphous semiconductor film. For example, a sputtering method, a CVD method, a plasma treatment method (e.g., a plasma CVD method), an adsorption method, or a method of applying a metal salt solution can be used. Among the methods given above, the method using a solution is useful in terms of easy adjustment of the concentration of the metal element. At this time, an oxide film is preferably deposited by UV light irradiation in an oxygen atmosphere, thermal oxidation, treatment with ozone water or hydrogen peroxide including a hydroxyl radical, or the like in order to improve the wettability of the surface of the amorphous semiconductor film and to spread an aqueous solution on the entire surface of the amorphous semiconductor film.

In a crystallization step for crystallizing the amorphous semiconductor film to form a crystalline semiconductor film, an element which promotes crystallization (also referred to as a catalytic element or a metal element) may be added to the amorphous semiconductor film, and crystallization may be performed by heat treatment (at 550° C. to 750° C. for 3 minutes to 24 hours). As the element which promotes (accelerates) the crystallization, one or more of iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

In order to remove or reduce the element which promotes crystallization from the crystalline semiconductor film, a semiconductor film containing an impurity element is formed in contact with the crystalline semiconductor film so as to function as a gettering sink. As the impurity element, an impurity element imparting n-type conductivity, an impurity element imparting p-type conductivity, a rare gas element, or the like can be used. For example, it is possible to use one or more kinds of elements selected from phosphorus (P), nitrogen (N), arsenic (As), antimony (Sb), bismuth (Bi), boron (B), helium (He), neon (Ne), argon (Ar), krypton (Kr), and xenon (Xe). A semiconductor film containing a rare gas element is formed in contact with the crystalline semiconductor film containing the element which promotes crystallization, and then heat treatment is performed (at 550° C. to 750° C. for 3 minutes to 24 hours). The element promoting crystallization that is contained in the crystalline semiconductor film moves into the semiconductor film containing a rare gas element, and thus the element promoting crystallization which is contained in the crystalline semiconductor film is removed or reduced. After that, the semiconductor film containing a rare gas element, which has functioned as a gettering sink, is removed.

The amorphous semiconductor film may be crystallized by a combination of thermal treatment and laser light irradiation. Alternatively, either thermal treatment or laser light irradiation may be performed plural times.

A crystalline semiconductor film can also be formed directly over the substrate by a plasma method. A crystalline semiconductor film may be selectively formed over the substrate by a plasma method.

An oxide semiconductor may be used for the semiconductor layer. For example, zinc oxide (ZnO), tin oxide ($SnO_2$), or the like can be used. In the case of using ZnO for the semiconductor layer, $Y_2O_3$, $Al_2O_3$, or $TiO_2$, a stacked layer thereof, or the like can be used for a gate insulating layer, and ITO, Au, Ti, or the like can be used for a gate electrode layer, a source electrode layer, and a drain electrode layer. In addition, In, Ga, or the like may be added to ZnO.

As the oxide semiconductor, a thin film represented by $InMO_3(ZnO)_m$ (m>0) can be used. Note that M denotes one or more of metal elements selected from gallium (Ga), iron (Fe), nickel (Ni), manganese (Mn), and cobalt (Co). For example, M is gallium (Ga) in some cases, and in other cases, M contains other metal elements in addition to Ga, such as Ga and Ni or Ga and Fe. Furthermore, the above oxide semiconductor may contain a transition metal element such as Fe or Ni or an oxide of the transition metal as an impurity element in addition to a metal element contained as M. For example, an In—Ga—Zn—O-based non-single-crystal film can be used as the oxide semiconductor layer.

As the oxide semiconductor layer (the $InMO_3(ZnO)_m$ (m>0) film), an $InMO_3(ZnO)_m$ film (m>0) in which M is another metal element may be used instead of the In—Ga—Zn—O-based non-single-crystal film. As the oxide semiconductor which is applied to the oxide semiconductor layer, any of the following oxide semiconductors can be applied in addition to the above: an In—Sn—Zn—O based oxide semiconductor; an In—Al—Zn—O based oxide semiconductor; a Sn—Ga—Zn—O based oxide semiconductor; an Al—Ga—Zn—O based oxide semiconductor; a Sn—Al—Zn—O based oxide semiconductor; an In—Zn—O based oxide semiconductor; a Sn—Zn—O based oxide semiconductor; an Al—Zn—O based oxide semiconductor; an In—O based oxide semiconductor; a Sn—O based oxide semiconductor; and a Zn—O based oxide semiconductor.

Embodiment 6 can be implemented by being combined with any of the structures described in the other embodiments as appropriate.

This application is based on Japanese Patent Application serial no. 2009-112375 filed with Japan Patent Office on May 2, 2009, the entire contents of which are hereby incorporated by reference.

What is claimed is:

1. An electronic device comprising:
   a display panel comprising a display portion in which display is configured to be controlled by a scan line driver circuit and a signal line driver circuit;
   a housing on one edge of the display panel; and
   a battery,
   wherein the display panel is flexible,
   wherein the housing is less flexible than the display panel,
   wherein the signal line driver circuit is in an integrated circuit inside the housing,
   wherein the scan line driver circuit is outside the housing,
   wherein the battery is inside the housing,
   wherein the display portion comprises a first transistor,
   wherein the scan line driver circuit comprises a second transistor, and
   wherein the first transistor and the second transistor includes a same semiconductor material.

2. The electronic device according to claim 1, wherein the same semiconductor material is an oxide semiconductor material.

3. The electronic device according to claim 1, wherein the display panel is a touch display panel.

4. The electronic device according to claim 1, wherein the battery has a sheet-like shape.

5. The electronic device according to claim 1, wherein the display panel comprises a depressed portion at which the display panel is configured to be bent.

6. The electronic device according to claim 1, wherein the electronic device is a liquid crystal display device.

7. An electronic device comprising:
   a display panel comprising a display portion in which display is configured to be controlled by a scan line driver circuit and a signal line driver circuit;
   a housing on one edge of the display panel; and
   a battery,
   wherein the display panel is flexible,
   wherein the housing is less flexible than the display panel,
   wherein the signal line driver circuit is in an integrated circuit inside the housing,
   wherein the scan line driver circuit is outside the housing,
   wherein the battery is inside the housing,
   wherein the display portion comprises a first transistor, wherein the scan line driver circuit comprises a second transistor, and
wherein the first transistor and the second transistor is on a same substrate.

8. The electronic device according to claim 7, wherein the display panel is a touch display panel.

9. The electronic device according to claim 7, wherein the battery has a sheet-like shape.

10. The electronic device according to claim 7, wherein the display panel comprises a depressed portion at which the display panel is configured to be bent.

11. The electronic device according to claim 7, wherein the electronic device is a liquid crystal display device.

12. An electronic device comprising:
a first display panel comprising a first display portion in which display is configured to be controlled by a first scan line driver circuit and a first signal line driver circuit;
a second display panel comprising a second display portion in which display is configured to be controlled by a second scan line driver circuit and a second signal line driver circuit;
a housing on one edge of the first display panel and one edge of the second display panel; and
a battery,
wherein the first display panel and the second display panel are flexible,
wherein the housing is less flexible than the first display panel and the second display panel,
wherein the first signal line driver circuit and the second signal line driver circuit are in an integrated circuit inside the housing,
wherein the first scan line driver circuit and the second scan line driver circuit are outside the housing, and
wherein the battery is inside the housing.

13. The electronic device according to claim 12, wherein the first display panel and the second display panel are touch display panels.

14. The electronic device according to claim 12, wherein the battery has a sheet-like shape.

15. The electronic device according to claim 12, wherein the first display panel and the second display panel each comprises a depressed portion at which the first display panel or the second display panel is configured to be bent.

16. The electronic device according to claim 12, wherein the electronic device is a liquid crystal display device.

* * * * *